United States Patent
Weisinger

(10) Patent No.: US 9,643,388 B2
(45) Date of Patent: May 9, 2017

(54) MULTILAYER FILMS, THEIR METHODS OF PRODUCTION, AND ARTICLES MADE THEREFROM

(75) Inventor: David R. Weisinger, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 279 days.

(21) Appl. No.: 13/309,670

(22) Filed: Dec. 2, 2011

(65) Prior Publication Data
US 2012/0196061 A1    Aug. 2, 2012

Related U.S. Application Data

(60) Provisional application No. 61/437,321, filed on Jan. 28, 2011.

(51) Int. Cl.
| | | |
|---|---|---|
| B32B 27/08 | (2006.01) | |
| B29C 47/06 | (2006.01) | |
| B32B 27/32 | (2006.01) | |
| B29K 23/00 | (2006.01) | |
| B29C 55/02 | (2006.01) | |
| B29C 47/00 | (2006.01) | |

(52) U.S. Cl.
CPC .......... B32B 27/32 (2013.01); B32B 27/08 (2013.01); *B29C 47/0021* (2013.01); *B29C 47/065* (2013.01); *B29C 55/023* (2013.01); *B29K 2023/14* (2013.01); *B32B 2439/06* (2013.01); *B32B 2439/70* (2013.01); *B32B 2439/80* (2013.01); *B32B 2605/00* (2013.01); *B32B 2605/003* (2013.01); *Y10T 428/1334* (2015.01); *Y10T 428/31913* (2015.04)

(58) Field of Classification Search
CPC ..... B32B 27/10; B32B 27/32; B32B 2307/31; B32B 2307/714; B32B 27/08; B32B 2439/06; B32B 2439/70; B32B 2439/80; B32B 2605/00; B32B 2605/003; B65D 65/42; B65D 65/40; B29C 47/0021; B29C 47/065; B29C 55/023; Y10T 428/1334; Y10T 428/31913; B29K 2023/14
USPC .................................................. 428/35.2, 516
See application file for complete search history.

(56) References Cited

U.S. PATENT DOCUMENTS

| | | | |
|---|---|---|---|
| 4,540,753 | A | 9/1985 | Cozewith et al. |
| 5,504,172 | A | 4/1996 | Imuta et al. |
| 6,500,563 | B1 | 12/2002 | Datta et al. |
| 6,642,316 | B1 | 11/2003 | Datta et al. |
| 6,844,078 | B2 | 1/2005 | Su et al. |
| 6,881,800 | B2 | 4/2005 | Friedersdorf |
| 6,884,850 | B2 | 4/2005 | Schauder et al. |
| 6,992,158 | B2 | 1/2006 | Datta et al. |
| 7,537,829 | B2 | 5/2009 | Pellingra, Jr. et al. |
| 2007/0082154 | A1 | 4/2007 | Ambroise et al. |
| 2007/0082155 | A1 | 4/2007 | Rehkugler et al. |
| 2007/0287007 | A1* | 12/2007 | Williams et al. ............. 428/349 |
| 2008/0286547 | A1 | 11/2008 | Hubbard et al. |
| 2011/0135916 | A1 | 6/2011 | Lu |

FOREIGN PATENT DOCUMENTS

| | | |
|---|---|---|
| WO | 00/01745 | 1/2000 |
| WO | 02/36651 | 5/2002 |
| WO | WO 2007/047133 | 4/2007 |
| WO | WO 2010/033276 | 3/2010 |

OTHER PUBLICATIONS

Coles, Richard; McDowell, Derek; Kirwan Mark J., Food Packaging Technology. Blackwell Publishing, 2003.*
Bovey, "*Polymer Conformation and Configuration*", Academic Press (1969).
Brandup et al., *Polymer Handbook*, Fourth Edition, John Wiley & Sons, Inc. (1999).
Cheng, "$^{13}C$ *NMR Analysis of Ethylene-Propylene Rubbers*", Macaromolecules, vol. 17, pp. 1950-1955 (1984).
Cheng et al., "$^{13}C$ *Nuclear magnetic resonance characterization of poly(propylene) prepared with homogeneous catalysts*", Makromol. Chem. vol. 190, pp. 1931-1943 (1989).
Ewen, "*Catalytic Polymerization of Olefins*", Studies in Surface Science and Catalysis 25, Proce3edings of the Int'l Symposium on Future Aspects of Olefin Polymerization, Toyko Japan, Jul. 4-6, 1985. Elsevier (1986).
Randall, *Polymer Sequence Determination—Carbon-13 NMR Method*, Academic Press (1977).
Periodic Table of Elements, Chem. Eng. News (1985).
Tsutsui et al., "Propylene homo- and copolymerization with ethylene using an ehtylenebis(1-indenyl)zirconium dichloride and methylaluminoxane catalyst system", Polymer, vol. 30, pp. 1350-1356 (1989).
Ver Strate et al., "*Near Monodisperse Ethylene-Propylene Copolymers by Direct Ziegler-Natta Polymerization. Preparation, Characterization, Properties*", Macromolecules, vol. 21, pp. 3360-3371 (1988).

* cited by examiner

Primary Examiner — Yan Lan

(57) ABSTRACT

This invention relates to a film including (i) at least one sealing layer, including greater than 50.0 wt. %, based on the total weight of the sealing layer, of a modifier, the modifier including a copolymer of propylene derived units and one or more comonomers selected from the group consisting of $C_2$ and $C_4$ to $C_{10}$ alpha-olefin derived units, wherein the comonomer content is in the range of about 2.0 to 25.0 wt. %; and (ii) at least one core layer, including a polymer having a propylene derived unit content of greater than 90 wt. %, based on the weight of the polymer; and wherein the film has a seal initiation temperature of 105° C. or less; and wherein when a seal is formed, the sealed film has a hermeticity of 65% or more. The invention also relates to methods to produce such films, articles including such films, and the use of such films to form heat sealed articles.

13 Claims, No Drawings

MULTILAYER FILMS, THEIR METHODS OF PRODUCTION, AND ARTICLES MADE THEREFROM

PRIORITY CLAIM

This application claims priority to U.S. Provisional Application Ser. No. 61/437,321 filed Jan. 28, 2011, the disclosure of which is fully incorporated herein by reference.

CROSS REFERENCE TO RELATED PATENT APPLICATIONS

This application is related to US Publication No. 2011/0135916 published Jun. 9, 2011 (2008EM172).

FIELD OF THE INVENTION

The present invention relates to heat-sealable multilayer films. More particularly, this invention relates to such multilayer films that have improved sealing properties.

BACKGROUND OF THE INVENTION

Polyolefin multilayer films, especially polypropylene based films, are widely used in packaging applications, such as pouches for dry food mixes, pet foods, snack foods, and seeds. In many film applications it is desirable to seal the film during the packaging operation. This may be accomplished by the use of adhesives or by using heat sealing techniques. When heat sealing is used, it is important that the plastic film be readily heat sealable while also possessing other good physical and mechanical properties such as resistance to tearing, high tensile strength, and good processability in high speed equipment. Such multilayer films preferably have the ability to form strong seals at relatively low temperatures and, in some instances, have the ability to do so in the presence of contamination in the seal region from the contents of the pouches.

U.S. patent application Ser. No. 11/096,298 discloses multilayer film wherein a soft polymer is blended in a core layer and a tie layer comprising the soft layer and, optionally, another polymer. A sealable layer is provided on the side of the tie layer opposite the core layer. The multilayer films may be transparent, contain a cavitating agent, or are pigmented to form an opaque film. Also, the multilayer film may be metallized or coated with a barrier coating.

U.S. patent application Ser. No. 11/248,838 discloses multilayer films including a core layer, a tie layer made from at least 10 wt. % of a first polymer and where the first polymer preferably is not present in the core layer. Optionally, the multilayer film may have a skin layer, a second tie layer, and/or a second skin layer.

U.S. patent application Ser. No. 11/521,657 discloses multilayer films including a core layer, a tie layer made from at least 10 wt. % of a first polymer and a service layer, wherein the tie layer is a sealable layer and may provide a hermetic seal when sealed to itself. Optionally, the multilayer film may have a skin layer and/or a second skin layer.

PCT Application No. WO 2007/047133 discloses heat-sealable, multilayer composite packaging structures. The film structure includes a first substrate, such as paper, bonded such as by extrusion lamination, to a sealable, high-barrier film including in this order: (1) a core layer comprising from about 5 wt. % to about 40 wt. % of a first polymer, wherein the first polymer includes a density in the range of 0.850 g/cm$^3$ to 0.920 g/cm$^3$, a DSC melting point in the range of 40° C. to 160° C., and a melt flow rate in the range of 2 dg/min to 100 dg/min; (2) a tie layer comprising said first polymer; and (3) a sealing layer, the tie layer being on a side of the core layer opposite the first substrate.

U.S. patent application Ser. No. 11/588,204 discloses heat sealable films having a heat sealable layer comprising a blend of propylene-based polymers.

U.S. patent application Ser. No. 11/804,630 discloses polypropylene films with moisture barrier properties. The multilayer films include a core layer having at least one nucleating agent and at least one water vapor transmission inhibitor. Optionally, the multilayer film may have at least one skin layer and at least one tie layer located intermediate the core layer and the at least one skin layer.

U.S. Pat. No. 6,844,078 discloses a coextruded multilayer film, having of at least a high crystalline propylene homopolymer resin layer of isotactic content greater than about 95%; a discharge-treated surface on one side of said polyolefin resin layer, an amount of hydrocarbon resin up to 10 wt. % of the high crystalline propylene homopolymer of greater than about 95% isotactic content; and on the high crystalline propylene homopolymer resin layer side opposite said discharge-treated surface, a heat sealable or winding layer having an antiblock.

PCT Application No. WO 2010/033276 discloses multilayer films which include at least one core layer and a sealing layer, and optionally a first tie layer intermediate the core layer and the skin layer. The sealing skin layer comprises a first polymer component having a heat of fusion of less than 75 J/g and a second polymer component. The multilayer film preferably has a seal strength greater than about 200 g/2.54 cm for a seal formed on a crimp sealer at a temperature of at least 93.3° C. The core layer may comprise a nucleating agent and a hydrocarbon resin. The multilayer film may be biaxially oriented and may be useful in packaging applications. These films contain less than 50% second polymer component in the sealing layer.

Opportunities exist for polymer films, particularly biaxially oriented polypropylene films, to replace other packaging substrates, such as paper and foil, in many temperature-sensitive packaging operations, such as with ice cream bars, chocolate bars, and dry-particulate foods. There remains a need for films having improved mechanical and optical properties (such as seal initiation temperature, hermeticity, hot tack strength, and seal temperature ranges) that also demonstrate good processability and orientation stability. In particular, there is a need for films that can be used in high-speed packaging equipment.

SUMMARY OF THE INVENTION

In one aspect, the disclosure relates to films comprising: (i) at least one sealing layer, comprising greater than 50.0 wt. %, based on the total weight of the sealing layer, of a modifier, the modifier comprising a copolymer of propylene derived units and one or more comonomers selected from the group consisting of $C_2$ and $C_4$ to $C_{10}$ alpha-olefin derived units, wherein the comonomer content is in the range of about 2.0 to 25.0 wt. %, the copolymer having: (a) an intermolecular composition distribution of greater than or equal to 75%; (b) a $T_m$ in the range of from about 25° C. to about 110° C.; (c) a $H_f$ in the range of from about 0.5 to about 70 J/g; (d) an $M_w/M_n$ in the range of from about 1.2 to about 4.5; and (e) an MFR in the range of from about 0.1 to about 40 g/10 min; and (ii) at least one core layer, comprising a polymer having: (a) a propylene derived unit content of greater than 90 wt. %, based on the weight of the polymer;

(b) a $T_m$ of greater than 120° C.; and (c) a MFR in the range of from about 0.1 to about 100 g/10 min; wherein the film has a seal initiation temperature of 105° C. or less; and wherein when a seal is formed, the sealed film has a hermeticity of 65% or more.

In another aspect, the disclosure relates methods of producing a film comprising co-extruding: (i) a sealing layer, wherein the sealing layer comprises greater than 50.0 wt. %, based on the total weight of the sealing layer, of a modifier comprising a copolymer of propylene derived units and one or more comonomers selected from the group consisting of $C_2$ and $C_4$ to $C_{10}$ alpha-olefin derived units, wherein the comonomer content is in the range of about 2.0 to 25.0 wt. % the copolymer having: (a) an intermolecular composition distribution of greater than or equal to 75%; (b) a $T_m$ in the range of from about 25° C. to about 110° C.; (c) a $H_f$ in the range of from about 0.5 to about 70 J/g; (d) a $M_w/M_n$ in the range of from about 1.2 to about 4.5; and (e) a MFR in the range of from about 0.1 to about 40 g/10 min; and (ii) a core layer having: (a) a propylene derived unit content of greater than 90 wt. %, based on the weight of the first polymeric resin; (b) a $T_m$ of greater than 120° C.; and (c) a MFR in the range of from about 0.1 to about 100 g/10 min; to produce a film; wherein the film has a seal initiation temperature of 105° C. or less; and wherein when a seal is formed, the sealed film has a hermeticity of 65% or more.

DETAILED DESCRIPTION

As used herein, the term "film" applies to fabricated articles, extruded, or otherwise, may have a thickness in the range of 0.1 mil. to 250 mil. (2.5 to 6350 µm).

As used herein, the term "layer" is used to refer to each of the one or more compositions, which may be the same or different, that are secured to one another by any appropriate means such as by an inherent tendency of the materials to adhere to one another, or by inducing the compositions to adhere as by a heating, radiative, chemical, or some other appropriate process. Layers are not limited to detectable, discrete compositions contacting one another such that a distinct boundary exists between the compositions. Preferably, however, the composition used to make one layer of a film will be different (i.e., the wt. % of components, the properties of each component, and/or the identity of the components may differ) from the composition used to make an adjacent layer, when present. A layer includes a finished product having a continuum of compositions throughout its thickness. The films of the present invention are multilayer, that is, comprise two or more layers. A layer may be laminated, by extrusion lamination or other means, to another layer. Films can be fabricated by any mode recognized in the industry, such as film casting.

For purposes of this invention and the claims thereto, the term "polymer" includes homopolymers, copolymers, and the like.

For purposes of this invention and the claims thereto, the term "copolymer" means any polymer comprising two or more different monomers, where "different" means differing by at least one atom, such as the number of carbons. Accordingly, terpolymers (comprising three different monomers) are considered copolymers.

For the purposes of this invention and the claims thereto, when a polymer is referred to as comprising a monomer, the monomer present in the polymer is the polymerized form of the monomer. Likewise when catalyst components are described as comprising neutral stable forms of the components, it is well understood by one of ordinary skill in the art, that the active form of the component is the form that reacts with the monomers to produce polymers.

A copolymer is considered a "random copolymer" if the number and distribution of comonomer derived units is consistent with the random statistical polymerization of the monomers.

The term "derived units" as used herein, refers to the polymerized form of the monomer from which the polymer was derived. For example, polyethylene comprises ethylene derived units, and a terpolymer of propylene/ethylene/butene comprises propylene derived units, ethylene derived units and butene derived units.

The new notation numbering scheme for the Periodic Table Groups is used herein as set out in CHEMICAL AND ENGINEERING NEWS, 63(5), 27 (1985).

As used herein, "wt. %" means weight percent and "mol. %" means mole percent. Further, all molecular weights are weight average, unless otherwise noted. All molecular weights are in units of g/mole, unless otherwise noted.

Films

Multilayer polymeric films having improved mechanical and optical properties and processability are described herein. These films may be used in a variety of applications, such as stretch films, shrink films, bags (i.e., shipping sacks, trash bags and liners, industrial liners, and produce bags), flexible and food packaging (e.g., fresh cut produce packaging, frozen food packaging), personal care films, pouches, medical film products, and diaper back sheets. Products may also include packaging, for example by bundling, packaging and unitizing a variety of products. Applications for such packaging include various foodstuffs, rolls of carpet, liquid containers and various like goods normally containerized and/or palletized for shipping, storage, and/or display.

To facilitate discussion of different film structures, the following notation is used herein. Each layer of a film is denoted "A" or "B", where "A" indicates a film layer formed from any of the polymeric resins comprising propylene derived units, as discussed below, and "B" indicates a film layer formed of any of the polymeric resins comprising ethylene derived units, for example, LLDPE polymers and blends, as discussed below. Films may also include additional layers, such as a layer C, comprising material different from either layer A or layer B. For example, layer C may comprise a substrate, a coating, or another polymeric resin. Where a film has more than one layer A, the layers A may be the same or different. Where a film has more than one layer B, the layers B may be the same or different. Where a film has more than one layer C, the layers C may be the same or different. Finally, the symbols for adjacent layers are separated by a slash (/). Using this notation, a three-layer film having an inner layer of a LLDPE polymer blend disposed between two polypropylene (PP) film layers would be denoted A/B/A. Similarly, a five-layer film of alternating outer/inner layers of PP and LDPE would be denoted A/B/A/B/A. Unless otherwise indicated, the left-to-right or right-to-left order of layers does not matter; e.g., an A/A/B/A film is equivalent to an A/B/A/A film.

"Outer" and "inner," as used herein in reference to layers, refer to the relative spatial disposition of the layers. For example, for a layer configuration such as C/A/A/B/B/A/C, each layer A is outer to any layer B, and each layer B is inner to layer A. In embodiments herein, each layer A is spatially disposed outwards relative to a layer B. Also, for a layer configuration such as A/B/B/B/B/A, layer A may be referred to as the "skin" layer, because it is the outermost layer of the film. Similarly, layer B may be referred to as the "core" layer, because the layers B are spatially disposed between two skin layers.

As above, one or more of the layers of the films disclosed herein may comprise polymeric resins. "Polymeric resin," as used herein, includes any known polymer comprising olefin derived units, and in particular, includes polymers of propylene derived units such as propylene homopolymers, propylene random copolymers, propylene impact copolymers, propylene block copolymers, and polymers of ethylene derived units, such as high density polyethylene, linear low density polyethylene, low density polyethylene, and blends thereof.

The thickness of each layer of the film, and of the overall film, is not particularly limited, but is determined according to the desired properties of the film. Typical film layers have a thickness of from about 1 to about 10,000 μm, more typically from about 5 to about 1,000 μm, and typical films have an overall thickness of from about 10 to about 100 μm.

In further applications, microlayer technology may be used to produce films with a large number of thinner layers. For example, microlayer technology may be used to obtain films having, for example, 24, 50, or 100 layers, in which the thickness of an individual layer is less than 1 μm. Individual layer thicknesses for these films may be less than 0.5 μm, less than 0.25 μm, or even less than 0.1 μm.

The multilayer polymeric films can have any number of layers in any ratio of thicknesses. In a preferred embodiment, a three layer film is produced having an outer skin layer, a middle core layer, and an inner skin layer in a ratio within a range of from 1/1/1 to 1/20/1 in one embodiment, and from 1/2/1 to 1/15/1 in another embodiment, and from 1/3/1 to 1/10/1 in yet another embodiment. Each layer can be any desirable thickness, and is within the range of from 1 to 100 μm in one embodiment, and from 2 to 80 μm in another embodiment, and from 2 to 60 μm in yet another embodiment, and from 3 to 40 μm in yet another embodiment, and from 4 to 15 μm in yet another embodiment. Given the variety of film structures as mentioned above (e.g., ABA, AABAA, etc.), the total film thickness can vary greatly. In one embodiment, the total film thickness or "film thickness" is within the range from 10 to 500 μm, and from 20 to 400 μm in another embodiment, and from 30 to 300 μm in yet another embodiment, and from 40 to 200 μm in yet another embodiment, and from 50 to 150 μm in yet another embodiment. Of course, a desirable thickness range of the layers and film can comprise any combination of an upper limit with any lower limit as described herein.

In embodiments herein, the multilayer polymeric films comprise at least one layer A and at least one layer B, wherein at least one of layers A and B further comprises a copolymer of propylene derived units and one or more $C_2$ and $C_4$ to $C_{10}$ alpha-olefin derived units. In some embodiments, the film comprises a combination of one or more of layers A and B arranged in a layer configuration, for example A/B/A, wherein a film having the ABA structure has three layers, an inner layer B, and outer layers A on either face of B. Examples of other layer configurations include A/A/B/A/A, A/B/A/A, A/B/A/B/A, A/A/B/B/B/A, A/B/B/B/B/A, A/A/B/B/B/A/A, and other variants comprising from 2, 3, 4, 5, 6, 7, 8, or more layers. In particular embodiments, the layer configuration is selected from A/B/B/B/B/A and A/A/B/B/B/A/A.

In other embodiments, the multilayer polymeric film may comprise an additional layer C, where layer C may comprise an adhesion-promoting tie layer, such as PRIMACOR™ ethylene-acrylic acid copolymers available from Dow Chemical Company (Freeport, Tex.), and/or ethylene-vinyl acetate copolymers. Other materials for C layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper. Further, one or more C layers can be replaced with a substrate layer, such as glass, plastic, paper, metal, etc., or the entire film can be coated or laminated onto a substrate. Thus, the inventive multilayer polymeric films disclosed herein, can be coated onto a substrate such as paper, metal, glass, plastic and other materials capable of accepting a coating. Such coated structures and articles are also within the scope of the present invention.

Structure and Formulation of Films

Embodiments herein relate to a film comprising: (i) at least one sealing layer, comprising greater than 50.0 wt. %, (at least 60 wt. %, at least 70 wt. %, at least 80 wt. %, at least 90 wt. %, or 100 wt. %) based on the total weight of the sealing layer, of a modifier comprising a copolymer of propylene derived units and one or more comonomers selected from the group consisting of $C_2$ and $C_4$ to $C_{10}$ alpha-olefin derived units wherein the comonomer content is in the range of about 2.0 to 25.0 wt. % (preferably from about 3 to 25 wt. %, more preferably from about 4.0 to about 25 wt. %, even more preferably 4.0 to 20 wt. %), the copolymer (preferably made by a metallocene catalyst) having: (a) an intermolecular composition distribution of greater than or equal to 75% (preferably greater than 80%, greater than 85%, preferably greater than 90%); (b) a $T_m$ in the range of from about 25° C. to about 110° C. (preferably from about 25° C. to about 85° C., from 25° C. to about 80° C., about 30° C. to about 85° C., about 30° C. to about 80° C.); (c) a $H_f$ in the range of from about 0.5 to about 70 J/g (preferably from about 0.5 to about 50 J/g, or more preferably from about 5 to about 40 J/g); (d) a $M_w/M_n$ in the range of from about 1.2 to about 4.5; and (e) an MFR in the range of from about 0.1 to about 40 g/10 min (preferably from about 1 to about 25 g/10 min, more preferably from about 2 to about 10 g/10 min); (and preferably the copolymer further has at least one of the following properties: (i) a $T_c$ of about 200° C. or less (preferably 150° C. or less); (ii) a density in the range of from about 0.85 to about 0.92 g/cm$^3$ (more preferably, from about 0.87 to 0.90 g/cm$^3$, more preferably from about 0.87 to about 0.89 g/cm$^3$); (iii) a percent crystallinity in the range of from 0.25% to 40% (preferably from about 0.25% to about 25%, more preferably from about 0.5% to about 22%, and most preferably from about 0.5% to about 20%); (iv) an mm triad tacticity index of 75% or greater (preferably 80% or greater, 82% or greater, 85% or greater, or 90% or greater); (v) a substantial absence of $^{13}$C NMR peaks corresponding to a regio-error at about 14.6 and about 15.7 ppm, the peaks being of about equal intensity; (vi) a m/r ratio of more than 1; (vii) a Vicat softening point of 105° C. or less (preferably 85° C. or less, or 60° C. or less); and (viii) a Mooney viscosity of less than 100 (more preferably less than 75, even more preferably less than 60, most preferably less than 30)); and (ii) at least one core layer, comprising a polymer having: (a) a propylene derived unit content of greater than 90 wt. %, based on the weight of the polymer; (b) a $T_m$ of greater than 120° C.; and (c) a MFR in the range of from about 0.1 to about 100 g/10 min; wherein the film has a seal initiation temperature of 105° C. or less (preferably 90° C. or less, 85° C. or less, or 70° C. or less); and wherein when a seal is formed, the sealed film has a hermeticity of 65% or more (preferably 75% or more, 80% or more, 85% or more, 90% or more, or most preferably 100%).

The films described herein comprise at least one core layer and at least one sealing layer. The sealing layer comprises a modifier, and optionally, another sealable polymer component ("SP"). The modifier comprises at least 50.0 wt. % of the sealing layer. The core layer may comprise a nucleating agent and a hydrocarbon resin. The multilayer film may further comprise one or more tie layers, an outer skin layer, and may be metallized.

In a preferred embodiment, a thin gauge multilayer film is provided that is suitable for packaging applications. Preferably the total thickness of the multilayer film is in the range of about 5 μm to about 60 μm, or in the range of about 10 μm to about 35 μm, or more preferably in the range of about 15 μm to about 30 μm, or in the range of about 12 μm to about 20 μm, or preferably in the range of about 15 μm to about 18 μm.

A modifier is blended or provided in the sealing skin layer of multilayer films discussed herein to facilitate improved seal strengths and, in some embodiments, low-temperature sealing properties. The multilayer film may, in some embodiments, comprise the modifier as a fractional component of the sealing layer. In other embodiments, the sealing layer is substantially comprised of modifier. The modifier may be considered a softening or compliance-enhancing additive. The presence of the modifier may allow the film's layers to act synergistically with each other to dissipate stress throughout the layers when subjected to the pressures of sealing jaws and when subjected to subsequent stresses on the seal, such as seal opening forces. When force is applied to a seal of the sealing skin layer to itself, the film diffuses or dissipates the stress throughout each of the layers through improved plastic deformation or compliance, instead of leaving the stress concentrated in the seal layer. A sealing layer that dissipates the stress may generally facilitate a stronger seal than the same film having a concentrated stress region.

The seal strength may be enhanced by reducing the modulus of the sealing skin layer and improving the melt or flow characteristics of the layer during sealing. Improved seal strength may be realized through improved bonding interaction between the film's layers. It is believed that decreasing the melt temperature of the sealing skin layer may increase the degree of entanglement and intermingling of the adjacent layer thus resulting in improved bonding at the interface of the layers adjacent to the sealing layer. Benefits of the improved flowability may manifest as film improvements during co-extrusion of the multilayer film and then again during sealing operations.

As a result of the improved elasticity or compliance, the films may also provide improvements in seal strength integrity and improved hermetic sealing, particularly in the more leak-prone folds, creases, and seams in the seal area, due to the improved film conformability during sealing. A hermetic seal is a seal that does not allow the passage of gas, such as air. "Hermeticity," as used herein, is the percentage of sealed packages that retain a hermetic seal, as tested by the Visual Check Underwater method, described below. A hermetic seal is particularly desirable to maintain a seal against a flow of gases such as in packaging of pharmaceuticals, food, several chemicals, and other consumer goods. The sealed multilayer polymeric films described herein preferably have a hermeticity of 65% or more, preferably 75% or more, preferably 80% or more, preferably 85% or more, or even more preferably 90% or more; or most preferably 100%.

Additionally, the films preferably have a seal initiation temperature so that it is suitable for packaging applications, such as food packaging. The desired seal initiation temperature ("SIT") may depend on the end use application of the film, for example, for chocolate bars the SIT may be the temperature at which the seal strength is 200 g/inch (80 g/cm), for potato chips in the United States the desired SIT may be the temperature at which the seal strength is 500 g/inch (20 g/cm), and for potato chips in Asia the SIT may be the temperature at which the seal strength is 1000 g/inch (400 g/cm). The SIT may also depend on the type of seal used, for example, a fin seal as compared to a crimp seal. The films described herein preferably have a SIT of 105° C. or less, more preferably 90° C. or less, more preferably 85° C. or less, or even more preferably 70° C. or less.

Sealing Layer

The sealing layer is generally one of the outermost layers or "skin" of the multilayer film and may be used to form a seal. The seal may be heat-sealable, pressure-sealable, or may include a sealing agent such as an adhesive. While the term "sealing skin" is used to describe this layer, an adhesive is not required. Preferably the sealing skin layer is heat sealable and includes polymers that are suitable for heat-sealing or self-bonding when crimped between heated crimp-sealer jaws.

In some embodiments of this disclosure, the sealing skin layer is contiguous to the core layer. In other embodiments, one or more other layers, such as one or more tie layers, may be intermediate to the core layer and the sealing skin layer.

In some embodiments, heat sealable blends may be utilized in the sealing layer. The sealing skin layer may comprise up to about 50.0 wt. % of the SP, or up to about 20.0 wt. % of the SP, based on the total weight of the sealing layer. In other embodiments, the sealing layer may comprise from about 5.0 wt. % to about 50.0 wt. % of the SP (or from about 10.0 wt. % to about 45.0 wt. % of the SP, or from about 15 wt. % to about 30.0 wt. % of the SP, or in preferred embodiments from about 0.5 wt. % to about 40.0 wt. % of the SP), based on the total weight of the sealing layer.

In preferred embodiments the sealing skin layer comprises 50.0 wt. % or more of the modifier, based on the total weight of the sealing skin layer. In other embodiments, the sealing skin layer may comprise from about 50.0 wt. % to about 100 wt. % of the modifier, or from about 55 wt. % to about 85 wt. % of the modifier, or preferably from about 60.0 wt. % to about 80.0 wt. % of the modifier, based on the total weight of the sealing skin layer. Generally the sealing skin layer comprises greater than 50.0 wt. % (preferably at least 60.0 wt. %, or at least 70.0 wt. %, or at least 80.0 wt. %, or at least 90.0 wt. %, or 100 wt. %) of the modifier.

In some embodiments the sealing layer may further comprise processing aids or one or more additives, such as opacifying agent, slip agents, anti-static agents, anti-block agents, and combinations thereof.

The thickness of the sealing layer is typically in the range of about 0.10 μm to 7.0 μm (preferably about 0.10 μm to 4 μm, and most preferably about 0.10 μm to 3 μm). In some film embodiments, the sealing layer thickness may be in the range of about 0.10 μm to 2 μm (or 0.10 μm to 1 μm, or 0.10 μm to 0.50 μm). In preferred film embodiments, the sealing layer has a thickness in the range of about 0.5 μm to 2 μm (0.5 μm to 3 μm, or 1 μm to 3.5 μm).

Modifier

The modifier includes polymer resins that are less stiff, have lower modulus, are more flexible and elastic, and tend to have a more plastic stress-strain behavior than the more common polymer film-forming resins, such as isotactic polypropylene and high-density polyethylene. Acceptable modifiers include, but are not limited to, resins having more elastic or amorphous-type functional properties as opposed to more crystalline properties.

The modifier may improve the compliance or resilience of the layer in which it is included, both during and after sealing. The modifier comprises at least one a copolymer of propylene derived units and one or more comonomers selected from the group consisting of $C_2$ and $C_4$ to $C_{10}$ alpha-olefin derived units.

The modifier has a comonomer content, based on the weight of the copolymer, in the range of from about 2.0 to 25.0 wt. %, preferably from about 3.0 to 25.0 wt. %, more preferably from about 4.0 to about 25 wt. %, or even more preferably 4.0 to 20 wt. %. The balance of the copolymer is propylene. Accordingly, modifiers useful in the present invention have an average propylene content, based on the weight of the copolymer, of from about 75.0 to about 98 wt. %, more preferably from about 75 to about 97 wt. %, more preferably from about 75 to about 96 wt. %, most preferably from about 80 to about 96 wt. %. In particular embodiments, the modifier is a propylene/ethylene copolymer.

The modifier has an intermolecular composition distribution (ICD) of greater than 75%, greater than 80%, greater than 85%, or preferably greater than 90%. ICD is an indicator of intermolecular homogeneity. The intermolecular composition distribution of the copolymer is determined by thermal fractionation in a solvent. A typical solvent is a saturated hydrocarbon such as hexane or heptane. The thermal fractionation procedure is described below. ICD may be determined by weight of the polymer isolated as one or two adjacent, soluble fractions with the balance of the polymer in immediately preceding or succeeding fractions; and wherein each of these fractions has a wt. % comonomer content with a difference of no greater than 20 wt. % (relative), preferably 10 wt. % (relative), of the average wt. % comonomer of the copolymer. The fractions are obtained at temperature increases of approximately 8° C. between stages. The ICD of the copolymer is determined by thermal fractionation in hexane as follows: about 30 grams of the semi-amorphous polymer is cut into small cubes of about ⅛ inch (0.32 cm) on the side and is then introduced into a thick walled glass bottle closed with screw cap along with 50 mg of IRGANOX 1076, an antioxidant commercially available from Ciba Specialty Chemicals (Basel, Switzerland). Then, 425 ml of hexane (a principal mixture of normal and iso isomers) is added to the contents of the bottle and the sealed bottle is maintained at about 23° C. for 24 hours. At the end of this period, the solution is decanted and the residue is treated with additional hexane for an additional 24 hours at 23° C. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the semi-amorphous polymer soluble at 40° C., 48° C., 55° C., and 62° C. are obtained at temperature increases of approximately 8° C. between stages. The soluble polymers are dried, weighed and analyzed for composition, as wt % ethylene content. To produce a copolymer having the desired narrow intermolecular composition distribution, it is beneficial if (1) a metallocene catalyst is used, preferably one which behaves as though only a single statistical mode of addition of the first and second monomer sequences is allowed; and (2) the copolymer is well-mixed in a continuous flow stirred tank polymerization reactor which allows only a single polymerization environment for substantially all of the polymer chains of the copolymer.

The modifier has a melting point ($T_m$) in the range of from about 25° C. to about 110° C., preferably from about 25° C. to about 85° C., from 25° C. to about 80° C., about 30° C. to about 85° C., more preferably about 30° C. to about 80° C. The procedure for measuring $T_m$ is described as follows. $T_m$ is measured using Differential Scanning calorimetry (DSC) using commercially available equipment such as a TA Instruments 2920 DSC. Typically, 6 to 10 mg of molded polymer or plasticized polymer is sealed in an aluminum pan and loaded into the instrument at room temperature. Melting data (first heat) is acquired by heating the sample to at least 30° C. above its melting temperature, typically 220° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature, typically −50° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed for onset of transition and peak temperature. The melting temperatures reported are the peak melting temperatures from the second heat unless otherwise specified. For polymers displaying multiple peaks, the $T_m$ is defined to be the peak melting temperature (i.e., associated with the largest endothermic calorimetric response in that range of temperatures) from the DSC melting trace; likewise, the crystallization temperature ($T_c$) is defined to be the peak crystallization temperature (i.e., associated with the largest exothermic calorimetric response in that range of temperatures) from the DSC crystallization trace.

The modifier has a heat of fusion ($H_f$) in the range of from about 0.5 to about 70 J/g, preferably from about 0.5 to about 50 J/g, or more preferably from about 5 to about 40 J/g. Preferably modifiers also have a heat of fusion that is greater than or equal to about 1 J/g, preferably greater than or equal to about 2.5 J/g, preferably greater than or equal to about 5 J/g. $H_f$ is determined according to the procedure described in ASTM E794-06, using a differential scanning calorimeter (DSC), as described below. Areas under the DSC curve are used to determine the heat of transition ($H_f$, upon melting or heat of crystallization, $H_c$, upon crystallization, if the $H_f$ value from the melting is different from the $H_f$ value obtained for the heat of crystallization, then the value from $T_m$ shall be used).

The modifier has a $M_w/M_n$ in the range of from about 1.2 to about 4.5. Techniques for determining the molecular weight ($M_n$, number average molecular weight, and $M_w$, weight average molecular weight) and molecular weight distribution ($M_n/M_w$) may be found in U.S. Pat. No. 4,540,753, which is incorporated by reference herein, and in Macromolecules 1988, 21, 3360, which is also incorporated by reference herein. $M_w$ and $M_n$ may be determined by size exclusion chromatography (SEC), e.g., 3D SEC, also referred to as GPC-3D. The $M_n/M_w$, also known as the polydispersity index, is the ratio of $M_w$ to $M_n$.

The modifier has a MFR in the range of from about 0.1 to about 40 g/10 min, preferably from about 1 to about 25 g/10 min, or more preferably from about 2 to about 10 g/10 min. As above, MFR is measured by ASTM D-1238, at 230° C., at 2.16 kg.

In a preferred embodiment, the modifier may have a g' of about 0.99 or greater. The branching index (g') is calculated using the output of a SEC-DRI-LS-VIS method as follows. A High Temperature Size Exclusion Chromatograph (SEC, either from Waters Corporation or Polymer Laboratories), equipped with a differential refractive index detector (DRI), an online light scattering (LS) detector, and a viscometer (VIS) is used. In particular, a high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and is determined from the DRI output. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i.e., between the integration limits. The branching index g' is defined as:

$$g' = \frac{[\eta]_{avg}}{kM_v^\alpha}$$

where, for purpose of this invention and claims thereto, $\alpha$=0.695 for ethylene, propylene, and butene polymers; and k=0.000579 for ethylene polymers, k=0.000262 for propylene polymers, and k=0.000181 for butene polymers. $M_v$ is the viscosity-average molecular weight based on molecular weights determined by SEC-DRI-LS-VIS analysis. It is well known in the art that as the g' value decreases, long-chain branching increases.

The modifier may further be characterized by other properties, such as $T_c$, density, percent crystallinity, a substantial absence of $^{13}$C NMR peaks corresponding to a regio-error at about 14.6 and about 15.7 ppm, the peaks being of about equal intensity, an mm triad tacticity index, propylene tacticity index m/r, Vicat Softening Point, and Mooney Viscosity, as described below.

In particular embodiments, the modifier may have any of (i) a $T_c$ of about 200° C. or less (preferably, 150° C. or less); (ii) a density in the range of from about 0.85 to about 0.92 g/cm³ (preferably, from about 0.87 to 0.90 g/cm³, from about 0.87 to about 0.89 g/cm³); (iii) a percent crystallinity in the range of from about 0.25% to 40% (preferably from about 0.25% to about 25%, from about 0.5% to about 22%, or from about 0.5% to about 20%); (iv) an mm triad tacticity index of 75% or greater (80% or greater, 82% or greater, 85% or greater, or 90% or greater); (v) a substantial absence of $^{13}$C NMR peaks corresponding to a regio-error at about 14.6 and about 15.7 ppm, the peaks being of about equal intensity; (vi) an m/r of more than 1; (vii) a Vicat Softening Point of 105° C. or less (preferably 85° C. or less or 60° C. or less); and (vii) a Mooney Viscosity of less than 100 (preferably less than 75, less than 60, or less than 30).

The modifier may have a $T_c$ of about 200° C. or less, preferably, 150° C. or less. $T_c$ is measured using the DSC methods discussed above.

The modifier may have a density in the range from about 0.85 to about 0.92 g/cm³ (preferably, from about 0.87 to 0.90 g/cm³, more preferably from about 0.87 to about 0.89 g/cm³) at room temperature, as measured by the ASTM D-1505 test method.

The modifier may have a percent crystallinity in the range of from 0.25% to 40% (preferably from about 0.25% to about 25%, from about 0.5% to about 22%, or from about 0.5% to about 20%) wherein percent crystallinity is determined using the DSC procedure described above. Areas under the DSC curve are used to determine the heat of transition ($H_f$ upon melting or heat of crystallization, $H_c$, upon crystallization, if the $H_f$ value from the melting is different from the $H_f$ value obtained for the heat of crystallization, then the value from the melting ($T_m$) shall be used), which can be used to calculate the degree of crystallinity (also called the percent crystallinity). The percent crystallinity (X %) is calculated using the formula: [area under the curve (in J/g)/H° (in J/g)]*100, where H° is the heat of fusion for the homopolymer of the major monomer component. These values for H° are to be obtained from the Polymer Handbook, Fourth Edition, published by John Wiley and Sons, New York 1999, except that a value of 290 J/g is used as the equilibrium heat of fusion (H°) for 100% crystalline polyethylene, a value of 140 J/g is used as the equilibrium heat of fusion (H°) for 100% crystalline polybutene, and a value of 207 J/g (H°) is used as the heat of fusion for a 100% crystalline polypropylene.

The modifier has a substantial absence of $^{13}$C NMR peaks corresponding to a regio-error at about 14.6 and about 15.7 ppm, the peaks being of about equal intensity. The $^{13}$C NMR peaks corresponding to a regio-error at about 14.6 and about 15.7 ppm are believed to be the result of stereoselective 2,1-insertion errors of propylene units into the growing polymer chain. In typical propylene-ethylene copolymers produced by constrained geometry non-metallocene catalysts, these peaks are of about equal intensity, and they represent about 0.02 to about 7 mol. % of the propylene insertions into the homopolymer or copolymer chain. The copolymer of propylene derived units and one or more $C_2$ and $C_4$ to $C_{10}$ alpha-olefin derived units does not have $^{13}$C NMR peaks corresponding to a regio-error at about 14.6 and about 15.7 ppm, and is made using a metallocene catalyst.

The modifier also has an mm triad tacticity index of three propylene units, as measured by $^{13}$C NMR techniques described above, of 75% or greater, 80% or greater, 82% or greater, 85% or greater, or 90% or greater. Polymer microstructure discussed herein is determined by $^{13}$C-NMR spectroscopy, including the concentration of isotactic and syndiotactic diads ([m] and [r]), triads ([mm] and [rr]), and pentads ([mmmm] and [rrrr]). Samples are dissolved in $d_2$-1,1,2,2-tetrachloroethane. Spectra are recorded at 125° C. using a NMR spectrometer of 100 MHz. Polymer resonance peaks are referenced to [mmmm]=21.8 ppm. Calculations involved in the characterization of polymers by NMR follow the work of F. A. Bovey in "Polymer Conformation and Configuration," Academic Press, New York 1969 and J. Randall in "Polymer Sequence Determination, $^{13}$C-NMR Method," Academic Press, New York, 1977. The percent of methylene sequences of two in length, % $(CH_2)_2$, is calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments are based on H. N. Cheng and J. A. Ewen, Makromol. Chem. 1989, 190, 1931. The mm triad tacticity index of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer. The mm triad tacticity index (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

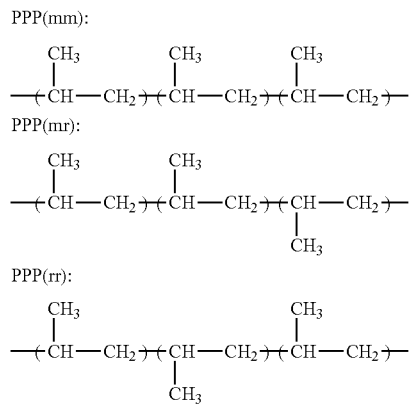

The $^{13}$C NMR spectrum of the propylene copolymer is measured as described in U.S. Pat. No. 5,504,172 and U.S. Pat. No. 6,642,316 (column 6, line 38 to column 9, line 18). The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), page 1350 or an article in the journal *Macromolecules*, 17, (1984), 1950 (In the event of a conflict between the Polymer article and the Macromolecules article, the Polymer article shall control). In the first region, the methyl group of the second unit in the three propylene derived unit chain represented by PPP (mm) resonates. In the second region, the methyl group of the second unit in the three propylene derived unit chain represented by PPP (mr) resonates, and the methyl group (PPE-methyl group) of a propylene derived unit whose adjacent units are a propylene derived unit and an ethylene derived unit, resonates (in the vicinity of 20.7 ppm). In the third region, the methyl group of the second unit in the three propylene derived unit chain represented by PPP (rr) resonates, and the methyl group (EPE-methyl group) of a propylene derived unit whose adjacent units are ethylene units resonates (in the vicinity of 19.8 ppm). The calculation of the mm triad tacticity index is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds, can be obtained. Thus, the peak areas of PPP(mm), PPP (mr), and PPP(rr) can be evaluated, and the mm triad tacticity index of the propylene unit chain consisting of head-to-tail bonds can be determined. Further information on how the mm triad tacticity can be determined from a $^{13}$C-NMR spectrum of the polymer, is described by J. A. Ewen, "Catalytic Polymerization of Olefins," (the Ewen method), Eds. T. Keii, K. Soga, Kodanska Elsevier Pub., Tokyo, 1986, p. 271; and as described in detail in U.S. Pat. No. 6,884,850, on page 8, in numbered paragraphs [0046] to [0054], all of which are incorporated by reference herein.

The modifier may have a propylene tacticity index, expressed as ratio of m to r (m/r), of more than 1. The propylene tacticity index m/r is determined by $^{13}$C NMR techniques, as described above. The propylene tacticity index m/r is calculated as discussed in H. N. Cheng, Macromolecules, 17, p. 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 describes an atactic material, and an m/r ratio of greater than 1.0 describes an isotactic material. An isotactic material theoretically may have a ratio approaching infinity, and many by-product atactic polymers have sufficient isotactic content to result in ratios of greater than 50. The modifier may have isotactic stereoregular propylene crystallinity. The term "stereoregular," as used herein, means that the predominant number, i.e. greater than 80%, of the propylene derived units in the polypropylene, exclusive of any other monomer such as ethylene, has the same 1,2 insertion and the stereochemical orientation of the pendant methyl groups is the same, either meso or racemic.

The modifier may have a Vicat Softening Point, as determined according to ASTM D1525, of 105° C. or less (preferably 85° C. or less, or 60° C. or less).

The modifier may have a Mooney viscosity ML(1+4) @125° C., as determined according to ASTM D1646 and measured in Mooney units, of less than 100 (preferably less than 75, less than 60, or less than 30).

In embodiments herein, the modifier is made using a metallocene catalyst. Modifiers used in the present invention are described in detail as the "Second Polymer Component" in U.S. Pat. No. 6,500,563 which is fully incorporated by reference herein. The modifiers may include copolymers prepared according to the procedures in WO 02/36651; U.S. Pat. No. 6,992,158; and/or WO 00/01745. Preferred methods for producing the copolymers are found in U.S. Pat. No. 6,881,800. Preferred copolymers are propylene-based elastomers (PBE) available commercially under the trade name Vistamaxx™ (ExxonMobil, Baytown Tex.). Suitable examples include: Vistamaxx™ 6202, Vistamaxx™ 3980FL, Vistamaxx™ 3020FL, Vistamaxx™ 6102, and Vistamaxx™ 3000.

Other Polymer Component (SP)

The sealing layer may further comprise another sealable polymer component ("SP"), which typically includes at least one polymer that is suitable for heat-sealing or bonding, when crimped between heated crimp-sealer jaws, fin, or lap sealing jaws. Suitable SPs may include homopolymers, copolymers, or terpolymers of ethylene or/and propylene, or a mixture thereof. The SP can be manufactured in any conventional manner, using Ziegler-Natta or metallocene catalysts or any other suitable catalyst system.

Preferably, the SP comprises a polymer that has a reduced melting temperature, as compared to more crystalline polymers. A lower crystallinity (and thus, lower specific heat of fusion ($\Delta H$)) material is desired as they generally provide better sealability. In a preferred embodiment, the SP has a $\Delta H$ of less than about 80 J/g, or more preferably less than about 75 J/g. Preferred SPs have a $\Delta H$ in the range of about 40 J/g to about 80 J/g, or more preferably in the range of about 50 J/g to about 75 J/g.

Examples of suitable SPs may include, but are not limited to, propylene copolymer, propylene-ethylene copolymer, polybutylene homopolymer and copolymers, ethylene-propylene-butene ("EPB") terpolymer, ethylene-propylene-hexene ("EPH") terpolymer ethylene vinyl acetate ("EVA"), metallocene-catalyzed propylene copolymer, and combinations thereof. In particular embodiments, the sealing layer further comprises a SP which is a propylene-based terpolymer or a propylene-based random copolymer, preferably the propylene-based terpolymer is a propylene/ethylene/butene terpolymer.

The sealing layer may additionally or alternatively include at least one of propylene-ethylene random copolymers, low density polyethylene (LDPE), linear low density polyethylene (LLDPE), medium density polyethylene (MDPE), and combinations thereof.

Examples of suitable commercially available SPs include: JPC 7794 and JPC 7510 (both ethylene-butene-propylene terpolymers available from Japan Polypropylene Corporation, Tokyo, Japan); EP 8573 an ethylene-propylene copolymer available from Total Petrochemical Company (Houston, Tex.); PB0300M a polybutylene homopolymer available from LyondellBasell Industries (Houston, Tex.); and Adsyl 3C30FHP and 7462 available from LyondellBasell.

Core Layer

The core layer of a multilayer film is most commonly the thickest layer of the film and provides the foundation of the multilayer structure. The core layer includes a polymer comprising propylene derived units and having: (a) a propylene derived unit content of greater than 90 wt. %, greater than 93 wt. %, or greater than 95 wt. %, based on the weight of the first polymeric resin; (b) a Tm of greater than 120° C., greater than 125° C., or greater than 130° C.; and (c) a MFR in the range of from about 0.1 to about 100 g/10 min, from about 1 to about 50 g/10 min, from about 2 to about 25 g/10 min, or from about 2 to about 15 g/10 min.

The core layer comprises a polymer having a propylene derived unit content of greater than 90 wt. %, greater than 93 wt. %, or greater than 95 wt. %. As used with respect to wt. %, "propylene derived unit content" means the wt. % of propylene-derived units based upon total weight of the first polymeric resin. In some embodiments, the first polymeric resin may be a homopolymer, where the first polymeric resin may comprise only propylene derived units, thereby having a propylene derived unit content of 100 wt. %.

The core layer comprises a polymer having a $T_m$ of greater than 120° C. (preferably greater than 125° C. or greater than 130° C.). The procedure for measuring $T_m$ is described above.

The core layer comprises a polymer having a MFR in the range of from about 0.1 to about 100 g/10 min (preferably from about 1 to about 50 g/10 min, from about 2 to about 25 g/10 min, or from about 2 to about 15 g/10 min). MFR is measured by ASTM-1238, 2.16 kg at 230° C., with a 1 minute preheat on the sample to provide a steady temperature for the duration of the experiment.

In some embodiments, the core layer may comprise a propylene polymer, ethylene polymer, isotactic polypropylene ("iPP"), high crystallinity polypropylene ("HCPP"), low crystallinity polypropylene, isotactic and syndiotactic polypropylene, ethylene-propylene ("EP") copolymers, and combinations thereof.

In a preferred embodiment, the core layer is an iPP homopolymer. Examples of suitable commercially available iPP include: PP4712E1 from ExxonMobil Chemical Company, and Total Polypropylene 3371 from Total Petrochemicals. An example of a useful HCPP is Total Polypropylene 3270 (commercially available from Total Petrochemicals).

The core layer preferably has a thickness in the range of about 5 μm to about 50 μm (preferably about 5 μm to 40 μm, 5 μm to 25 μm, or 5 to 10 μm).

In a preferred embodiment, the core layer comprises a nucleating agent. An exemplary nucleating agent for use in a polypropylene core layer can be one that induces crystallization at a temperature near the melting point of polypropylene, but by itself is solid at such a temperature. In other words, a good nucleating agent may be an organic material that has a crystallization temperature above that of polypropylene and is compatible with polypropylene at melting conditions.

Extremely high melting point materials or ground inorganic materials may be used as nucleating agents in the present disclosure. The use of organic materials may be advantageous under extrusion conditions because high melting point organic materials may be non-particulate and as such may be more readily and uniformly dispersed into the polypropylene melt. Upon cooling, the organic material will solidify throughout the polypropylene melt matrix. In this manner, a true nucleating effect can be obtained.

It is believed that the nucleating agent induces crystal growth within the core layer, thus providing more smaller crystals than that achieved without the nucleating agent. This in turn enables the core layer to be stiffer and provides improved barrier properties.

In one embodiment, a polypropylene resin may be used which includes a nucleating agent that may be non-particulate mix of carboxylic acids.

Combinations of suitable nucleating agents may also be used. Any suitable nucleating agent may be used if the nucleating agent is sufficiently well dispersed throughout the resin.

Examples of suitable commercially available nucleating agents that can be utilized in the multilayer film include: but are not limited to, 3,4-dimethylbenzylidene sorbitol, available as MILLAD® 3988, HYPERFORM® HPN-68L (bicyclo[2.2.1]heptane-2,3-dicarboxylic acid, disodium salt), both from Milliken Chemicals (Spartanburg, S.C.); N,N'-dicyclohexyl-2,6-napthalenecarboxamide and the family of substituted 1,3,5-benzenetrisamide; and sodium 2,2'-methylene bis(4,6-di-tert-butylphenyl)phosphate, available as IRGASTAB® NA 11 from BASF Corporation (Florham Park, N.J.).

In another embodiment, the core layer may comprise a nucleated polypropylene. An example of a suitable commercially available nucleated polypropylene is FF035C available from Braskem Corporation (Philadelphia, Pa.). A propylene that has been previously nucleated may be preferred, to ensure that the nucleating agent is sufficiently well dispersed throughout the resin in the core layer.

Preferably the core layer further comprises a water vapor transmission inhibitor, such as, for example, a hydrocarbon resin ("HCR"). In one embodiment, the core layer includes a low molecular weight HCR that is compatible with polypropylene. An exemplary HCR has a suitable Mn, for example a Mn less than about 5000, preferably less than about 2000, and more preferably from about 500 to about 1000. The HCR can be natural or synthetic and can have a suitable softening point, for example from about 60° C. to about 180° C., preferably from about 80° C. to 130° C. (as determined according to ASTM-E 28). Exemplary HCRs can include petroleum resins, terpene resins, styrene resins, cyclopentadiene resins and saturated alicyclic resins, among others.

Suitable petroleum resins can be those prepared in the presence of a catalyst or may be thermally polymerized petroleum materials. These petroleum materials can contain a mixture of resin-forming substances such as ethylindene, butadiene, isoprene, piperylene, pentylene, polystyrene, methylstyrene, vinyltoluene, indene, polycyclopentadiene, polyterpenes, polymers of hydrogenated aromatic hydrocarbons, alicyclic hydrocarbon resins, and combinations thereof.

The styrene resins can be homopolymers of styrene or copolymers of styrene with other monomers, such as, for example, alpha methylstyrene, vinyltoluene, and butadiene.

The cyclopentadiene resins can be cyclopentadiene homopolymers or cyclopentadiene copolymers. Dicyclopentadiene and substituted dicyclopentadiene resins, such as methyl-substituted dicyclopentadiene, may also be used.

Preferably, the HCR is a saturated alicyclic hydrocarbon resin. Saturated alicyclic HCRs utilized in the multilayer film may be obtained by hydrogenation of aromatic hydrocarbon resins. The aromatic resins can be obtained by polymerizing reactive unsaturated hydrocarbons containing aromatic hydrocarbons in which reactive double bonds are generally in side-chains. The saturated alicyclic resins can be obtained from the aromatic resins by hydrogenating the latter until all, or almost all, of the unsaturation has disappeared, including the double bonds in the aromatic rings. Although exemplary aromatic hydrocarbons useful in the preparation of the alicyclic resins can be compounds containing reactive double bonds in side-chains, they may also comprise aromatic hydrocarbons having reactive double bonds in condensed ring systems. Examples of such useful aromatic hydrocarbons include vinyltoluene, vinylxylene, propenylbenzene, styrene, methylstyrene, indene, methylindene and ethylindene. Mixtures of several of these hydrocarbons may also be used. Examples of suitable commercially available alicyclic resins include ARKON® resins by Arakawa Chemical Industries, Ltd. of Osaka, Japan.

Examples of suitable commercially available HCRs include PICCOLYTE® resins from Hercules Incorporated of Wilmington, Del.; REGALREZ® and REGALITE® resins from Eastman Chemical Company of Kingsport, Tenn.; and ESCOREZ® and OPPERA® resins from ExxonMobil Chemical Company.

In one embodiment, the core layer may include a masterbatch of polypropylene and a HCR. It may be useful to use a masterbatch in order to ensure sufficient dispersion of the HCR throughout the core layer. An example of a suitable masterbatched HCR is, for example, PA610A, which is a masterbatch of 50% HCR and 50% polypropylene (commercially available from ExxonMobil Chemical Company). In one embodiment, the HCR is hydrogenated and has a softening point of about 140° C. and a weight average molecular weight (Mw) of 500 g/mole and is blended into a masterbatch with polypropylene.

The nucleating agent and water vapor transmission inhibitor may be substantially evenly distributed or dispersed at least laterally throughout the core layer. The nucleating agent incorporated into the core layer may be present in an amount, for example, of up to about 3000 ppm (parts-per-million) of the resin of the core layer or, for example, in an amount of about 25 ppm to about 1000 ppm, or in an amount of about 50 ppm to about 200 ppm. The water vapor transmission inhibitor may be present in an amount, for example, of up to about 30 wt. %, preferably up to about 15 wt. % of the core layer. In some embodiments, the water vapor transmission inhibitor is a HCR and may be present in the core layer in an amount up to about 30 wt. %, preferably from about 2 wt. % to about 15 wt. %, more preferably from about 3 wt. % to about 10 wt. %, relative to the core layer.

The core layer may further comprise at least one additive in addition to the nucleating agent and the hydrocarbon resin. Examples of useful additives are opacifying agents, pigments, colorants, cavitating agents, slip agents, antioxidants, anti-fog agents, antistatic agents, fillers, and combinations thereof. Preferably, the total amount of additives in the core layer (other than the HCR and nucleating agent) may comprise up to about 20 wt. % of the core layer, but in some embodiments, up to about 30 wt. % of the core layer based on the total weight of the core layer.

Tie Layers

The multilayer film of this disclosure may optionally comprise one or more tie layers. As is known to those skilled in the art, the tie layer of a multilayer film is typically used to connect two other partially or fully incompatible layers of the multilayer film structure, e.g., a core layer and a skin layer, and is typically positioned intermediate these layers.

In one embodiment there is a first tie layer located intermediate to the core layer and the sealing layer. The first tie layer may be in direct contact with the surface of the core layer or, in other embodiments, another layer or layers may be intermediate to the core layer and the first tie layer.

In another embodiment a second tie layer is optionally present and is located intermediate to the core layer and the outer skin layer.

In some preferred embodiments, the tie layer may comprise an adhesion promoting material such as a maleic anhydride modified polypropylene an example of which is ADMER™ ATI 179A (commercially available from Mitsui Chemicals America, Inc., Rye Brook, N.Y.).

In some embodiments the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof.

The thickness of the tie layer is typically in the range of about 0.50 to 25 µm (preferably about 0.50 µm to 12 µm, about 0.50 µm to 6 µm, or about 2.5 µm to 5 µm). However, in some thinner films, the tie layer thickness may be in the range of about 0.5 µm to 4 µm (preferably about 0.5 µm to 2 µm or about 0.5 µm to 1.5 µm).

The thickness of the second tie layer may be in the range of 0.50 μm to 25 μm (preferably from about 1 μm to 12 μm), about 1 μm to 10 μm), about 0.5 μm to 8 μm, or 1 μm to 6 μm), or 1 μm to 4 μm).

Skin Layer

An outer skin layer is an optional layer and when present is provided on the opposite side of the core layer from the sealing layer. The skin layer may be contiguous to the core layer or contiguous to one or more other layers positioned intermediate the core layer and the skin layer. The skin layer may be provided to improve the film's barrier properties, processability, printability, and/or compatibility for metallization, coating, and lamination to other films or substrates.

The outer skin layer may comprise a polymer that provides a printable or metallizable layer or that enhances processability of the film. For example, in some embodiments the outer skin layer may comprise a polymer selected from the group consisting of polyethylene (PE), PP polymer, an EP copolymer, an EPB terpolymer, a PB copolymer, an ethylene-vinyl alcohol (EVOH) polymer, and combinations thereof. Preferably, the PE polymer is high-density polyethylene ("HDPE"), such as M-6211 and HDPE M-6030 (both available from Equistar Chemical Company) or HD-6704.67 (commercially available from ExxonMobil Chemical Company); and preferably the PP polymer is an EP copolymer, such as EP-8573 (commercially available from Total Petrochemical Company).

For coating and printing functions, the outer skin layer may preferably comprise a co- or terpolymer that has been surface treated. For metallizing or barrier properties, a HDPE, PP, PB copolymer, or EVOH may be preferred. A suitable EVOH copolymer is Eval G176B (commercially available from Kuraray Company Ltd. of Osaka, Japan).

The skin layer may also comprise processing aids or additives, such as anti-block agents, anti-static agents, slip agents, and combinations thereof.

The thickness of the skin layer depends upon the intended function of the skin layer, but is typically in the range of about 0.50 μm to 3.5 μm (preferably from about 0.50 μm to 2 μm, or from about 0.50 μm to 1.5 μm). Also, in thinner film embodiments, the second skin layer thickness may range from about 0.50 μm to 1.0 μm or 0.50 μm to 0.75 μm.

Additives

One or more layers of the multilayer film may further contain one or more additives. Examples of useful additives include, but are not limited to, opacifying agents, pigments, colorants, cavitating agents, slip agents, antioxidants, anti-fog agents, anti-static agents, anti-block agents, moisture barrier additives, gas barrier additives, hydrocarbon resins, hydrocarbon waxes, fillers such as calcium carbonate, diatomaceous earth and carbon black, and combinations thereof. Such additives may be used in effective amounts, which vary depending upon the property required.

Examples of suitable opacifying agents, pigments, or colorants include, but are not limited to, iron oxide, carbon black, aluminum, titanium dioxide, calcium carbonate, poly terephthalate, talc, beta nucleating agents, and combinations thereof.

Cavitating agents or void-initiating particles may be added to one or more layers of the multilayer film to create an opaque film. Preferably, the cavitating agents or void-initiating particles are added to the core layer. Generally, the cavitating or void-initiating additive includes any suitable organic or inorganic material that is incompatible with the polymer material(s) contained in the layer(s) to which the cavitating or void-initiating additive is added, at the temperature of biaxial orientation. Examples of suitable void-initiating particles include, but are not limited to, polybutylene teraphthalate ("PBT"), nylon, cyclic-olefin copolymers, solid or hollow pre-formed glass spheres, metal beads or spheres, ceramic spheres, calcium carbonate, talc, chalk, or combinations thereof. The average diameter of the void-initiating particles typically ranges from about 0.1 μm to 10 μm. The particles may be of any desired shape, or preferably they are substantially spherical in shape. Preferably, the cavitating agents or void-initiating particles are present in the layer at less than 30 wt. %, or less than 20 wt. %, or most preferably in the range of 2 wt. % to 10 wt. %, based on the total weight of the layer. Alternatively, one or more layers of the multilayer film may be cavitated by beta nucleation, which includes creating beta-form crystals of polypropylene and converting at least some of the beta-crystals to alpha-form crystals thus leaving small voids remaining after the conversion.

Slip agents that may be used include, but are not limited to, higher aliphatic acid amides, higher aliphatic acid esters, waxes, silicone oils, and metal soaps. Such slip agents may be used in amounts in the range of 0.1 wt. % to 2 wt. % based on the total weight of the layer to which it is added. An example of a fatty acid slip additive that may be used is erucamide. In one embodiment, a conventional polydialkyl-siloxane, such as silicone oil or silicone gum, additive having a viscosity of 10,000 to 2,000,000 cSt is used.

Non-migratory slip agents may be used in one or more of the outer surface layers of the multilayer films. Non-migratory means that these agents do not generally change location throughout the layers of the film in the manner of migratory slip agents. A preferred non-migratory slip agent is polymethylmethacrylate ("PMMA"). The non-migratory slip agent may have a mean particle size in the range of 0.5 μm to 15 μm), or 1 μm to 10 μm), or 1 μm to 5 μm), or 2 μm to 4 μm), depending on the layer's thickness and desired slip properties. Alternatively, the size of the particles in the non-migratory slip agent, such as PMMA, may be greater than 10% of the thickness of the surface layer containing the slip agent, or greater than 20% of the layer's thickness, or greater than 50% of the layer's thickness, or in some embodiments greater than 100% of the layer's thickness. Generally spherical, particulate non-migratory slip agents are contemplated. A commercially available example of a PMMA resin is EPOSTAR™ which is available from Nippon Shokubai Co., Ltd. of Osaka, Japan.

An example of a suitable antioxidant includes phenolic anti-oxidants, such as IRGANOX® 1010, which is commercially available from Ciba-Geigy Company of Basle, Switzerland. Such an antioxidant may be used in an amount ranging from 0.1 wt. % to 2 wt. %, based on the total weight of the layer to which it is added.

Anti-static agents that may be used include alkali metal sulfonates, poly ether-modified polydiorganosiloxanes, polyalkylphenylsiloxanes, tertiary amines, glycerol mono-stearate, blends of glycerol mono-stearate and tertiary amines, and combinations thereof. Such anti-static agents may be used in amounts in the range of about 0.05 wt. % to 3 wt. %, based on the total weight of the layer to which the anti-static is added. An example of a suitable anti-static agent is ARMOSTAT™ 475, commercially available from Akzo Nobel, Flying Hills, Pa.

Useful antiblock additives include, but are not limited to, silica-based products such as inorganic particulates such as silicon dioxide, calcium carbonate, magnesium silicate, aluminum silicate, calcium phosphate, and the like. Other useful antiblock additives include polysiloxanes and non-meltable crosslinked silicone resin powder, such as TOSPEARL™, which is commercially available from Toshiba Silicone Co., Ltd, Tokyo, Japan. Anti-blocking agents may be effective in amounts up to about 30,000 ppm of the layer to which it is added.

Examples of useful fillers include but are not limited to, finely divided inorganic solid materials such as silica, fumed silica, diatomaceous earth, calcium carbonate, calcium silicate, aluminum silicate, kaolin, talc, bentonite, clay, and pulp.

Suitable moisture and gas barrier additives may include effective amounts of low-molecular weight resins, hydrocarbon resins, particularly petroleum resins, styrene resins, cyclopentadiene resins, and terpene resins. The multilayer film may also contain a hydrocarbon wax in one or more layers. The hydrocarbon wax may be either a mineral wax or a synthetic wax. Hydrocarbon waxes may include paraffin waxes and microcrystalline waxes. Typically, paraffin waxes having a broad molecular weight distribution are preferred as they generally provide better barrier properties than paraffin waxes with a narrow molecular weight distribution.

Optionally, one or more of the outer surface layers may be compounded with a wax or coated with a wax-containing coating, for lubricity, in amounts in the range of 2 wt. % to 15 wt. % based on the total weight of the layer.

Film Orientation

The multilayer film may be uniaxially or biaxially oriented. Orientation in the direction of extrusion is known as machine direction ("MD") orientation. Orientation perpendicular to the direction of extrusion is known as transverse direction ("TD") orientation. Orientation may be accomplished by stretching or pulling a film first in the MD followed by the TD. Orientation may be sequential or simultaneous, depending upon the desired film features. Preferred orientation ratios are commonly from between about three to about six times the extruded width in the MD and between about four to about ten times the extruded width in the TD.

Blown films may be oriented by controlling parameters such as take up and blow up ratio. Cast films may be oriented in the MD direction by take up speed, and in the TD through use of tenter equipment. Blown films or cast films may also be oriented by tenter-frame orientation subsequent to the film extrusion process, in one or both directions. Typical commercial orientation processes are BOPP (biaxially oriented polypropylene) tenter process and LISIM® (available from Brueckner Maschininbau GmbH, Siegesdorf, Bavaria) technology.

In particular embodiments, sealed films herein are BOPP films. This is particularly advantageous because this provides the advantage of downgauging, that is, the ability to have thinner films while maintaining or improving the mechanical and physical properties of the film. This improves sustainability, as less packaging will be used, by weight, in consumer applications.

Surface Treatment

One or both of the outer exposed surfaces of the multilayer film may be surface-treated to increase the surface energy of the film to render the film receptive to metallization, coatings, printing inks, and/or lamination. The surface treatment can be carried out according to one or the methods known in the art. Preferred methods include, but are not limited to, corona discharge, flame treatment, plasma treatment, chemical treatment, or treatment by means of a polarized flame.

In a preferred embodiment, the outermost surface of the film that is opposite the sealing skin layer is surface treated. Thus, in a preferred embodiment the sealing skin layer is not surface treated. If there are two sealing skin layers, only one outer surface will generally be treated.

Metallization

One or both of the outer exterior surfaces of the multilayer film may be metallized. Generally, the metallized layer is one of the outer skin and/or sealing layers. However, if no skin or sealing layer is present, the surface of a core layer may be metallized. Such layers may be metallized using conventional methods, such as vacuum deposition of a metal layer such as aluminum, copper, silver, chromium, or mixtures thereof.

Metallization is generally applied to which ever outermost surface of the film that has been treated. Metallization or coatings may be applied alone or in some cases together. When metallization and coatings are applied together, either may be applied first, followed by the other.

In some embodiments, the film may first be surface treated, for example by flame treatment, and then be treated again in the metallization chamber, for example by plasma treatment, immediately prior to being metallized.

Coatings

One or more coatings, such as for barrier, printing, and/or processing, may be applied to one or both of the outer surfaces of the multilayer films. Such coatings may include acrylic polymers, such as ethylene acrylic acid ("EAA"), ethylene methyl acrylate copolymers ("EMA"), polyvinylidene chloride ("PVDC"), poly(vinyl)alcohol ("PVOH"), ethylene(vinyl)alcohol ("EVOH"), and combinations thereof.

Before applying the coating composition, the outer surface of the film may be treated to increase its surface energy. This treatment may help to ensure that the coating layer will be strongly adhered to the outer surface of the film, and thus reduce the possibility of the coating peeling or being stripped from the film. This treatment can be accomplished by employing known techniques, such as flame treatment, plasma, film chlorination, treatment with oxidizing agents such as chromic acid, hot air or steam treatment, and the like, or preferably by corona discharge. After treatment of the film surface, the coating composition may then be applied thereto.

An intermediate primer coating may be applied to the multilayer film. This is particularly useful in applications where a greater coating-to-film adherence is desired than that resulting from surface treatment of the film. Before applying the primer the film may first be treated to provide increased active adhesion sites on the film's surface (thereby promoting primer adhesion). Then a continuous coating of a primer material may be applied to the surface treated film surface. Examples of useful primer materials are well known in the art and include, but are not limited to, epoxy and poly(ethyleneimine) materials. The primer provides an overall adhesively active surface for thorough and secure bonding with the subsequently applied coating composition. The primer may be applied to the film by conventional solution methods, for example, by roller application.

The coating composition may be applied to the film in any conventional manner such as by an emulsion coating technique, by a solution, by gravure coating, roll coating, dipping, spraying, or the like, or may be applied by co-extrusion, and/or lamination. Any excess aqueous solution can be removed by squeeze rolls, doctor knives, and the like.

The film can be stretched in the MD, coated with the coating composition and then stretched perpendicularly in the TD. In another embodiment, the coating can be carried out after biaxial orientation is complete.

The coating composition may be applied in such as amount so that there will be deposited upon drying a smooth, evenly distributed layer. The coating may be dried by hot air, radiant heat, or by any other conventional means. Generally, the coating composition is on the order of 0.2 μm to 5 μm in thickness. Useful coatings may have coating weights in the range of 0.35 to 5.5 g of coating per square meter of film. In some embodiments, the coating weight may range from 0.5 g/m$^2$ to 1.6 g/m$^2$ for conventional PVOH coatings, 0.78 g/m$^2$ to 2.33 g/m$^2$ for conventional acrylic and low temperature seal coatings, and 1.6 g/m$^2$ to 6.2 g/m$^2$ for conventional PVDC coatings.

Film Properties

The films made from the compositions of the present invention have a new and useful combination of properties that allow them to be used as sealable films and enable them to be processed and oriented with good stability.

Films herein have one or more of the following properties: (i) a seal initiation temperature of 105° C. or less (preferably 90° C. or less, 85° C. or less, or 70° C. or less); (ii) when a seal is formed, the sealed film has a hermeticity of 65% or more (preferably 75% or more, 80% or more, 85% or more, or 90% or more); (iii) a hot tack strength of greater than 320 g/inch (preferably greater than 340 g/inch, greater than 360 g/inch, greater than 380 g/inch, greater than 400 g/inch, or greater than 410 g/inch); (iv) a packaging speed of greater than 15 mpm (preferably greater than 20 mpm, or greater than 26 mpm); (v) a crimp seal range of 80° C. or greater (preferably 90° C. or greater, 100° C. or greater, or 110° C. or greater); and (vi) a haze of less than 1.0% (preferably less than 0.8%, less than 0.6%, or less than 0.4%). This new and useful combination of properties is each discussed in turn, below.

The films described herein preferably have a SIT of 105° C. or less, preferably 90° C. or less, preferably 85° C. or less, or even more preferably 70° C. or less). Seals are formed using sealing devices such as LAKO™ Heat Sealer (MODEL SL-10) and HAYSSEN™ Heat Sealer (Model Ultimate II). Seal Initiation Temperature ("SIT") is a measure of the sealing property of a film and is the temperature at which a heat seal may support a given force and is determined as follows: heat seals are formed using one of the above heat sealers at temperatures that are raised incrementally. The specified peel force of the LAKO™ Heat Sealer and HAYSSEN™ Heat Sealer is 80 g/cm. As used herein, the SIT is the sealing temperature when the seal strength reaches 200 g of peeling force on a 1 inch (2.54 cm) wide film sample when tested at 60 psi seal pressure, 0.75 seconds of dwell time, and 20 seconds of cooling time with a vertical seal jaw.

The sealed multilayer polymeric films described herein preferably have a hermeticity of 65% or more, preferably 75% or more, preferably 80% or more, preferably 85% or more, or even more preferably 90% or more. Hermeticity testing is a failure analysis technique used to detect ambient atmosphere leakage paths into the cavity of a hermetically sealed package. Leakage in this context refers to the free movement of moisture and gases to and from the package cavity through openings that an otherwise perfect hermetic seal wouldn't have. The amount of leakage determines the magnitude of the hermeticity failure of the package. As used herein, hermetic failure refers to visually detectable leaks, as determined by the method below, and hermeticity is reported as the percentage of the sample having no leaks (thereby retaining a hermetic seal). A hermeticity of 100% is most preferred. Hermeticity is determined as follows: Sealed pouches filled with air are obtained using a HAYSSEN™ Ultima II VFFS machine, retrofitted with an air flow meter. A roll of film is placed on the VFFS machine. The crimp temperature is set at or above the MST of the film or lamination. The lap and/or fin seal temperature is set above the SIT of the film or lamination. The flow meter is used to meter air into the packages at a flow rate of 190 SCFH (standard cubic feet per hour). A total of twenty bags, filled with air, measuring approximately 35.6 cm by 13.3 cm, are produced at the rate of 55 bags/min, per crimp/fin temperature combination. Hermeticity testing is performed using a Visual Check instrument (Visual Check International, Fresno, Calif.) of dimensions 20 inches×14 inches×10 inches (50.8 cm×35.6 cm×25.4 cm). Generally, sealed packages, usually, sealed bags or sealed pouches, are placed in the Visual Check instrument, which has been filled with water to the fill line. The instrument is closed, thereby immersing the sealed bags in the water at room temperature. The head space is evacuated to a pressure of 8 in Hg (203 mmHg). As the air is evacuated, the packages expand, putting pressure on the seals. The packages are then visually inspected for signs of bubble emission, which indicates hermetic seal failure. If a package has emitted a bubble, the entire package is deemed to have failed. The internal air-fill of the finished packages is important for this test, as too much air-fill will create excessive internal pressure which could cause premature seal leakage or rupturing of packages. Conversely, too little air fill limits the package's ability to expand properly, thus falsely indicating a good hermetic seal. Five packages are randomly selected to verify the appropriate air fill of the sample packages, prior to testing. A GREISINGER handheld manometer is used to measure the internal pressure of the package in mbar, under the hermeticity testing conditions. Acceptable internal pressures of filled packages may be from about 80 to about 90 mbar. Once it is established that the filled packages have the appropriate air-fill, hermeticity testing is then conducted on the filled packages at a pressure of 203 mmHg, as discussed above. Four packages are tested at a time. Packages are observed for leakage at the corners of both top and bottom crimp seal and at the crimp/fin back seal intersection where the two seals intersect. Records are made of the number of packages that leak per sampling of 20 bags, and hermeticity is reported as the percentage of packages that did not leak.

In embodiments herein, the films have a hot tack strength of greater than 320 g/inch (126 g/cm) (preferably greater than 340 g/inch (134 g/cm), greater than 360 g/inch (142 g/cm), greater than 380 g/inch (150 g/cm), greater than 400 g/inch (157 g/cm), or greater than 410 g/inch (162 g/cm)). "Hot tack" is the strength of a heat seal immediately after sealing, while still in a hot condition, that is, before it has cooled down to ambient temperature and achieved its final strength. In production lines, the package is often filled by dropping the product into the package from a certain height, or by horizontally filling, both of which will exert a force on the package bottom. If package bottom cannot resist the disruptive force of filling, the seal on the bottom of the package will fail. For optimum production line efficiency, the interval between heat-sealing the film to make the package and filling the package with product is very short, and it is usually not possible for seal completely cool before filling. Accordingly, hot tack strength becomes important.

In embodiments herein, the film has a crimp seal range of greater than 80° C. (preferably greater than 90° C., greater than 100° C., or greater than 110° C.). A broad crimp seal range is desirable because it provides a wider operating range (which is particularly valuable when heat control is a problem, or where dwell times vary because of frequent machine speed changes) and it allows for faster packaging speeds. Crimp seal ranges are reported as upper seal distortion temperature minus the seal SIT.

Hot tack performance and crimp seal ranges may be determined using a HAYSSEN™ Ultima II VFFS machine (Duncan, S.C.). A roll of film or lamination is placed on the VFFS machine. The crimp temperature is set at or above the SIT of the film or lamination. The lap and/or fin seal temperature is set above the SIT of the film or lamination. In the examples, the multilayer films were extrusion laminated to Biocor® LCX (an OPP film commercially available from ExxonMobil Chemical Company). A total of six to nine empty bags measuring approximately 35.6 cm by 13.3 cm are produced at the rate of 55 bags/min. Three bags are randomly selected and filled with approximately 16 ounces of red kidney beans. A horizontal crimp jaw design was used. The bags are then examined for seal creep (e.g., loosening or release of seal width). Seal creep is preferably less than 0.16 cm for all crimp seals and lap and/or fin seals on the bag. The crimp temperature is increased at increments of approximately 5.5° C. until the film or lamination is visually thermally distorted.

Heat seals useful in packaging are commonly lap and fin seals, as crimp or flat seals. Most frequently, vertical form fill and seal ("VFFS") and/or horizontal form fill and seal ("HFFS") useful in snack packaging will employ a flat fin seal and two crimp seals. For extended shelf life, a hermetic seal is desirable. Additionally, being able to seal a package using a low SIT, and having the resultant seal be a good hermetic seal is especially desirable and may afford considerable cost savings to manufacturers and brand owners.

Embodiments herein preferably have a packaging speed of greater than 15 mpm, preferably greater than 20 mpm, or greater than 26 mpm. Packaging speed may be evaluated on a Fuji/Foremost Alpha Wrapper V HFFS machine (Woodinville, Wash.). Packaging speeds are reported in units of meters per minute (mpm). The SIT ideally achieves crimp seal strength values of >200 g/inch for both the leading and trailing crimp seals on a finished package. The effective seal range starts at the SIT value and continues up to the melt temperature of the film (usually about 340° F.).

In embodiments herein, the films have a haze of less than 1.0%, preferably less than 0.8%, less than 0.6%, or less than 0.4%. Haze is the percentage of transmitted light that, in passing through a specimen, deviates from the incident beam by forward scattering. Only light flux deviating more than 2.5° on the average is considered to be haze. The contrast of an object seen through a film decreases with increasing haze. Haze of the films herein is determined as per ASTM D-1003.

Methods of Production of Films

In one embodiment, a method of preparing a film may comprise the steps of co-extruding at least: a core layer and a sealing layer, wherein the sealing layer comprises greater than 50.0 wt. % (preferably at least 60 wt. %, at least 70 wt. %, at least 80 wt. %, at least 90 wt. %, or 100 wt. %), based on the total weight of the sealing layer, of a modifier comprising a copolymer of propylene derived units and one or more comonomers selected from the group comprising $C_2$ and $C_4$ to $C_{10}$ alpha-olefin derived units.

The method may further comprise the step of orienting the film in the machine direction and/or the transverse direction to the same or different extent.

The method may further comprise additionally co-extruding one or more tie layers and/or an outer skin layer.

The method may further comprise the steps of enclosing a product or article within at least a portion of the co-extruded film, engaging a first portion of the skin layer with a second portion of the skin layer at a seal area, and applying pressure and heat at the seal area, optionally for a determined duration of time, to cause the first portion to engage with the second portion to create at least one of a fin seal, a lap seal, and a crimp seal in the seal area.

Embodiments herein may also pertain to articles comprising the film disclosed herein, and/or made by methods disclosed herein. The articles are preferably bags or pouches. In preferred embodiments, the article is preferably a metallized bag. In some embodiments, the article is sealed.

INDUSTRIAL APPLICATIONS

The multilayer films may be useful as substantially standalone film webs or they may be coated, metallized, and/or laminated to other film structures. Multilayer films according to the present disclosure may be prepared by any suitable means. Preferably, the multilayer film is co-extruded, casted, oriented, and then prepared for its intended use such as by coating, printing, slitting, or other converting methods.

In one embodiment, the multilayer film may be formed by co-extruding the core layer, the tie layer, and the sealing skin layer together with any additional layers through a flat sheet extruder die at a temperature in the range of between 200° C. to 260° C., casting the film onto a cooling drum and quenching the film. The sheet is then stretched from 3 to 7 times its original size, in the machine direction (MD) orienter, followed by stretching from 5 to 10 times its original size in the transverse direction (TD) orienter. The film is then wound onto a reel. Optionally, one or both of the external surfaces may be coated and/or flame treated or corona treated before winding.

In general, the multilayer film comprises at least a core layer and a sealing layer. Additional layers may be incorporated in the multilayer film; for example, the multilayer film may comprise a one or more tie layers and/or an outer skin layer, wherein the a first tie layer would be intermediate the core layer and the sealing skin layer and a second tie layer would be intermediate the core layer and the outer skin layer. The core layer generally represents from about 40 to about 90 percent of the thickness of the total film.

In one embodiment, the film is a five-layer film with an EVOH metallizable skin for improved barrier properties and an adhesion promoting tie layer between the EVOH skin and the core layer. Also, white opaque films can be made by adding a cavitating agent to the core layer.

The multilayer film may be used as a flexible packaging film to package an article or consumer good. In some applications, the film may be formed into a pouch type of package, such as may be useful for packaging a beverage, liquid, granular, or dry-powder product.

The film may also be used as labeling or imaging film. The film may be printed by any conventional means, contemplated printing means include letterpress, offset, silk screen, electrostatic and photographic methods. Specific printing methods contemplated include thermal dye transfer (including dye sublimation), lithographic printing, flexographic printing, gravure printing, hot stamping, valley printing, roll-leaf printing and spanishing. Polyolefins are normally treated before printing in order to make them receptive to inks. Treating methods include casing, electronic treating, and flame treating.

For some applications, it may be desirable to laminate the multilayer films to other polymeric film or paper products for purposes, such as package decor including printing and metallizing.

Embodiments herein also relate to the use of the film disclosed herein to form a heat sealed article.

In other embodiments, the invention relates to:

1. A film comprising:

(i) at least one sealing layer, comprising greater than 50.0 wt. %, (at least 60 wt. %, at least 70 wt. %, at least 80 wt. %, at least 90 wt. %, or 100 wt. %) based on the total weight of the sealing layer, of a modifier comprising a copolymer of propylene derived units and one or more comonomers selected from the group consisting of $C_2$ and $C_4$ to $C_{10}$ alpha-olefin derived units wherein the comonomer content is in the range of about 2.0 to 25.0 wt. % (preferably from about 3 to 25 wt. %, more preferably from about 4.0 to about 25 wt. %, even more preferably 4.0 to 20 wt. %), the copolymer (preferably made by a metallocene catalyst) having:

(a) an intermolecular composition distribution of greater than or equal to 75% (preferably greater than 80%, greater than 85%, preferably greater than 90%);

(b) a $T_m$ in the range of from about 25° C. to about 110° C. (preferably from about 25° C. to about 85° C., from 25° C. to about 80° C., about 30° C. to about 85° C., about 30° C. to about 80° C.);

(c) a $H_f$ in the range of from about 0.5 to about 70 J/g (preferably from about 0.5 to about 50 J/g, or more preferably from about 5 to about 40 J/g);

(d) an $M_w/M_n$ in the range of from about 1.2 to about 4.5; and (e) an MFR in the range of from about 0.1 to about 40 g/10 min (preferably from about 1 to about 25 g/10 min, more preferably from about 2 to about 10 g/10 min); (and preferably the copolymer further has at least one of the following properties:

(i) a $T_c$ of about 200° C. or less (preferably 150° C. or less);

(ii) a density in the range of from about 0.85 to about 0.92 g/cm$^3$ (more preferably, from about 0.87 to 0.90 g/cm$^3$, more preferably from about 0.87 to about 0.89 g/cm$^3$);

(iii) a percent crystallinity in the range of from 0.25% to 40% (preferably from about 0.25% to about 25%, more preferably from about 0.5% to about 22%, and most preferably from about 0.5% to about 20%);

(iv) an mm triad tacticity index of 75% or greater (preferably 80% or greater, 82% or greater, 85% or greater, or 90% or greater);

(v) a substantial absence of $^{13}$C NMR peaks corresponding to a regio-error at about 14.6 and about 15.7 ppm, the peaks being of about equal intensity;

(vi) an m/r ratio of more than 1;

(vii) a Vicat softening point of 105° C. or less (preferably 85° C. or less, or 60° C. or less); and (viii) a Mooney viscosity of less than 100 (more preferably less than 75, even more preferably less than 60, most preferably less than 30)); and (ii) at least one core layer, comprising a polymer having:

(a) a propylene derived unit content of greater than 90 wt. %, based on the weight of the polymer;

(b) a $T_m$ of greater than 120° C.; and (c) a MFR in the range of from about 0.1 to about 100 g/10 min;

wherein the film has a seal initiation temperature of 105° C. or less (preferably 90° C. or less, 85° C. or less, or 70° C. or less); and wherein when a seal is formed, the sealed film has a hermeticity of 65% or more (preferably 75% or more, 80% or more, 85% or more, 90% or more, or most preferably 100%).

2. The film of paragraph 1, wherein the copolymer of propylene derived units is a propylene/ethylene copolymer.

3. The film of paragraphs 1 and 2, wherein the sealing layer further comprises a propylene-based terpolymer, a propylene-based random copolymer, or a mixture thereof (preferably the propylene-based terpolymer is a propylene/ethylene/butene terpolymer).

4. The film of any of paragraphs 1 to 3, wherein the film is oriented in the machine direction and/or the transverse direction, to the same or different extents.

5. The film of any of paragraphs 1 to 4, wherein the film has a hot tack strength of greater than 320 g/inch (126 g/cm) (preferably greater than 340 g/inch (134 g/cm), greater than 360 g/inch (142 g/cm), greater than 380 g/inch (150 g/cm), greater than 400 g/inch (157 g/cm), or greater than 410 g/inch (161 g/cm)).

6. The film of any of paragraphs 1 to 5, wherein the film has a crimp seal range of 80° C. or greater (preferably greater than 90° C. or greater, 100° C. or greater, 110° C. or greater).

7. The film of any of paragraphs 1 to 6, wherein the film has a packaging speed of greater than 15 mpm (preferably greater than 20 mpm or greater than 26 mpm).

8. The film of any of paragraphs 1 to 7, wherein the film has a haze of less than 1.0% (preferably less than 0.8%, less than 0.6%, or less than 0.4%).

9. A method of producing the film of paragraphs 1 to 8, comprising the steps of co-extruding:

(i) a sealing layer, wherein the sealing layer comprises greater than 50.0 wt. % (preferably at least 60 wt. %, at least 70 wt. %, at least 80 wt. %, at least 90 wt. %, or 100 wt. %), based on the total weight of the sealing layer, of a modifier comprising a copolymer of propylene derived units and one or more comonomers selected from the group consisting of $C_2$ and $C_4$ to $C_{10}$ alpha-olefin derived units (preferably made by a metallocene catalyst) wherein the comonomer content is in the range of about 2.0 to 25.0 wt. % (preferably from about 3 to 25 wt. %, more preferably from about 4.0 to about 25 wt. %, even more preferably 4.0 to 20 wt. %), the copolymer having:

(a) an intermolecular composition distribution of greater than or equal to 75% (preferably greater than 80%, greater than 85%, preferably greater than 90%);

(b) a $T_m$ in the range of from about 25° C. to about 110° C. (preferably from about 25° C. to about 85° C., from 25° C. to about 80° C., about 30° C. to about 85° C., more preferably about 30° C. to about 80° C.);

(c) a $H_f$ in the range of from about 0.5 to about 70 J/g (preferably from about 0.5 to about 50 J/g, or more preferably from about 5 to about 40 J/g);

(d) a $M_w/M_n$ in the range of from about 1.2 to about 4.5; and (e) a MFR in the range of from about 0.1 to about 40 g/10 min (preferably from about 1 to about 25 g/10 min, more preferably from about 2 to about 10 g/10 min); (and preferably at least one of the following properties:

(i) a $T_c$ of about 200° C. or less (preferably 150° C. or less);

(ii) a density in the range of from about 0.85 to about 0.92 g/cm$^3$ (more preferably, from about 0.87 to 0.90 g/cm$^3$, more preferably from about 0.87 to about 0.89 g/cm$^3$);

(iii) a percent crystallinity in the range of from 0.25% to 40% (preferably from about 0.25% to about 25%, more preferably from about 0.5% to about 22%, and most preferably from about 0.5% to about 20%);

(iv) an mm triad tacticity index of 75% or greater (preferably 80% or greater, 82% or greater, 85% or greater, or 90% or greater);

(v) a substantial absence of $^{13}C$ NMR peaks corresponding to a regio-error at about 14.6 and about 15.7 ppm, the peaks being of about equal intensity;

(vi) an m/r ratio of more than 1;

(vii) a Vicat softening point of 105° C. or less (preferably 85° C. or less, or 60° C. or less); and (viii) a Mooney viscosity of less than 100 (more preferably less than 75, even more preferably less than 60, most preferably less than 30); and (ii) a core layer comprising a polymer having:

(a) a propylene derived unit content of greater than 90 wt. %, based on the weight of the polymer;

(b) a $T_m$ of greater than 120° C.; and (c) an MFR in the range of from about 0.1 to about 100 g/10 min; and (iii) optionally, a tie layer, wherein the first tie layer is intermediate to the core layer and the sealing skin layer; to produce a film;

wherein the film has a seal initiation temperature of 105° C. or less (preferably 90° C. or less, 85° C. or less, or 70° C. or less); and wherein when a seal is formed, the sealed multilayer polymeric film has a seal having a hermeticity of 65% or more (75% or more, 80% or more, 85% or more, 90% or more, or 100%).

10. An article comprising the film of paragraphs 1 to 8, or produced by the method of paragraph 9 (preferably the article is a bag).

11. The use of the film of paragraphs 1 to 8, or produced by the method of paragraph 9 to form a heat sealed article.

While the illustrative embodiments have been described with particularity, it will be understood that various other modifications will be apparent to and can be readily made by those skilled in the art without departing from the spirit and scope of the invention. To the extent that this description is specific, it is solely for the purposes of illustrating certain embodiments of the invention and should not be taken as limiting the present inventive concepts to these specific embodiments. Accordingly, it in not intended that the scope of the claims appended hereto be limited to the examples and descriptions set forth herein but rather that the claims should be construed as encompassing all the features of patentable novelty which reside in the present disclosure, including all features which would be treated as equivalents thereof by those skilled in the art to which the disclosure pertains.

EXAMPLES

The inventive multilayer films will now be further described with reference to the following non-limiting examples. When possible, standard ASTM tests were used to determine the multi-layer film's properties.

The thickness of the film and the thickness of the film's layers was measured using an optical gauge Model #283-20 available from Beta LaserMike, Dayton, Ohio.

Seals were formed using sealing devices such as LAKO™ Heat Sealer (MODEL SL-10) and HAYSSEN™ Heat Sealer (Model Ultimate II).

Seal Initiation Temperature ("SIT") is a measure of the sealing property of a film and is the temperature at which a heat seal may support a given force and is determined as follows: heat seals are formed using one of the above heat sealers at temperatures that are raised incrementally. The minimum seal temperature is reached when one temperature yields a seal value of less than a specified g/cm peel force and the next temperature yields a seal value of greater than or equal to the specified g/cm peel force. The specified peel force of the LAKO™ Heat Sealer and HAYSSN™ Heat Sealer is 80 g/cm.

Hot tack performance may be determined using a HAYSSEN™ Ultima II VFFS machine. A roll of film was placed on the VFFS machine. The crimp temperature was set at or above the MST of the film. The fin seal temperature was set above the SIT of the film or lamination. In the examples, the multilayer films were extrusion laminated on the outside to LCX. A total of six to nine empty bags measuring approximately 35.6 cm by 13.3 cm were produced at the rate of 55 bags/min. Three bags were randomly selected and filled with approximately 16 ounces of red kidney beans. A horizontal crimp jaw design was used. Films were sealed in a sealing layer-to-sealing layer configuration. The bags were then examined for seal creep (e.g., loosening or release of seal width). Preferred seal creep was less than 0.16 cm for all crimp seals and fin seals on the bag. The crimp temperature was increased at increments of approximately 5.5° C. until the film or lamination is visually thermally distorted. Seal and hot tack ranges were reported as upper seal distortion temperature minus the seal SIT.

Haze of the films herein was determined as per ASTM D-1003.

Hermeticity was determined as follows. Sealed pouches filled with air were obtained using a HAYSSEN™ Ultima II VFFS machine, retrofitted with an air flow meter. A roll of film was placed on the VFFS machine. The crimp temperature was set at or above the MST of the film or lamination. The fin seal temperature was set above the SIT of the film or lamination. The flow meter was used to meter air into the packages at a flow rate of 190 SCFH (standard cubic feet per hour). A total of twenty sealed bags, filled with air, measuring approximately 35.6 cm by 13.3 cm, were produced at the rate of 55 bags/min, per crimp/fin temperature combination. Hermeticity testing was performed using a Visual Check instrument (Visual Check International, Fresno, Calif.) of dimensions 20 inches by 14 inches by 10 inches (50.8 cm by 35.6 cm by 25.4 cm). Generally, sealed packages, usually, sealed bags or sealed pouches, were placed in the Visual Check instrument, which had been filled with water to the fill line. The instrument was closed, thereby immersing the sealed bags in the water at room temperature. The head space was evacuated to a pressure of 8 inHg (203 mmHg).

As the air was evacuated, the packages expanded, putting pressure on the seals. The packages were then visually inspected for signs of bubble emission, which indicated hermetic seal failure. If a package emitted a bubble, the entire package was deemed to have failed. The internal air-fill of the finished packages was important for this test, as too much air-fill would create excessive internal pressure which could cause premature seal leakage or rupturing of packages. Conversely, too little air fill may limit the package's ability to expand properly, thus falsely indicating a good hermetic seal. Five packages were randomly selected to verify the appropriate air fill of the sample packages, prior to testing. A GREISINGER handheld manometer was used to measure the internal pressure of the package in mbar, under the hermeticity testing conditions. Acceptable internal pressures of filled packages may be from about 80 to about 90 mbar.

Once it was established that the filled packages have the appropriate air-fill, hermeticity testing was then conducted on the filled packages at a pressure of 203 mmHg, as discussed above. Four packages were tested at a time. Packages were observed for leakage at the corners of both top and bottom crimp seal and at the crimp/fin back seal intersection where the two seals intersect. Records were made of the number of packages that leak per sampling of 20 bags, and hermeticity was reported as the percentage of packages that had no leaks.

TABLE 1

Various Components Of the Multilayer Films

| Material | Layer | Brief Description | Commercial Source |
|---|---|---|---|
| PP 4712 | Core Layer | Polypropylene homopolymer; density = 0.900 g/cm$^3$; MFR (2.16 kg @ 230° C., ASTM D-1238) = 2.8 g/10 min | Exxon-Mobil Chemical Co. |
| JPC XPM7510 | Sealing Layer | Ethylene-butene-propylene terpolymer | Japan Polypropylene Co. |
| Vistamaxx ™ 3980FL | Sealing Layer (Modifier) | Propylene-ethylene elastomer; density = 0.879 g/cm$^3$; MFR (2.16 kg @ 230° C., ASTM D-1238) = 8.3 g/10 min; Propylene content of 91.5 wt. % | Exxon-Mobil Chemical Co. |
| Vistamaxx ™ 6102FL | Sealing Layer (Modifier) | Propylene-ethylene elastomer; density = 0.862 g/cm$^3$; MFR (2.16 kg @ 230° C., ASTM D-1238) = 3.0 g/10 min; Propylene content of 84 wt. % | Exxon-Mobil Chemical Co. |
| EM-1[1] | Sealing Layer (Modifier) | Propylene-ethylene elastomer; density = 0.884 g/cm$^3$; MFR (2.16 kg @ 230° C., ASTM D-1238) = 5.9 g/10 min; Propylene content of 94 wt. % | Exxon-Mobil Chemical Co. |
| EM-2[1] | Sealing Layer (Modifier) | Propylene-ethylene elastomer; density = 0.888 g/cm$^3$; MFR (2.16 kg @ 230° C., ASTM D-1238) = 4.3 g/10 min; Propylene content of 95.6 wt. % | Exxon-Mobil Chemical Co. |
| Adsyl 7462 | Sealing Layer | Density = 0.90 g/cm$^3$; MFR (2.16 kg @ 230° C., ISO 1133) = 5.5 g/10 min; | Lyondell-Basell Industries |
| EP 8573 | Sealing Layer | Propylene-ethylene random copolymer; density = 0.895 g/cm$^3$; MFR (2.16 kg @ 230° C., ASTM D-1238) = 6.8 g/10 min; | Total Petrochemicals |
| Versify ™ 3200 | Sealing Layer | Density = 0.876 g/cm$^3$; MFR (2.16 kg @ 230° C., ASTM D-1238) = 8.0 g/10 min; Total crystallinity = 30% | Dow Chemical Co. (Freeport, TX) |
| Versify ™ 3000 | Sealing Layer | Density = 0.891 g/cm$^3$; MFR (2.16 kg @ 230° C., ASTM D-1238) = 8.0 g/10 min; Total crystallinity = 44% | Dow Chemical Co. |

[1]Propylene-based elastomers of the type disclosed in U.S. Pat. No. 7,271,209.

Various co-extruded biaxially oriented multilayer films were made and tested. The multilayer films were melting coextruded, quenched on a casting drum, and subsequently reheated in the machine direction orienter to about 85° C. to about 105° C. The film was then stretched in the MD at 4.3 times and further annealed, in the annealing section of the machine direction orienter. The MD stretched film was subjected to further transverse direction orientation via conventional tenter frame at nine times in the TD. The TD preheat temperature was from about 155° C. to about 180° C., stretching temperature was from about 145° C. to about 165° C., and annealing temperature was from about 165° C. to about 170° C. Films 1-23 were made as described in Table 2, below. The films were, on average, about 25.4 microns thick.

TABLE 2

Modification of Sealing Or Core Layers Of Films 1 to 23

| FILM NO. | Lamination | Sealing Layer | Terpolymer (wt. %) | Modifier (wt. %) | Core Layer | Core (wt. %) | Modifier (wt. %) |
|---|---|---|---|---|---|---|---|
| 1 (Reference) | Yes | JPC XPM7510 + no modifier | 100 | 0 | PP 4712 + no modifier | 100 | 0 |
| Vistamaxx ™ 3980 Modified Sealing Layer | | | | | | | |
| 2 (Comparative) | Yes | JPC XPM7510 + Vistamaxx ™ 3980 | 80 | 20 | PP 4712 + no modifier | 100 | 0 |
| 3 (Comparative) | Yes | JPC XPM7510 + Vistamaxx ™ 3980 | 60 | 40 | PP 4712 + no modifier | 100 | 0 |
| 4 (Inventive) | Yes | JPC XPM7510 + Vistamaxx ™ 3980 | 40 | 60 | PP 4712 + no modifier | 100 | 0 |
| Reference Film: Adsyl; No Modifier | | | | | | | |
| 5 (Reference) | Yes | Adsyl 7462 + no modifier | 100 | 0 | PP 4712 + no modifier | 100 | 0 |
| Versify ™ 3200 Modified Sealing Layer | | | | | | | |
| 6 (Comparative) | Yes | JPC XPM7510 + Versify ™ 3200 | 80 | 20 | PP 4712 + no modifier | 100 | 0 |
| 7 (Comparative) | Yes | JPC XPM7510 + Versify ™ 3200 | 60 | 40 | PP 4712 + no modifier | 100 | 0 |
| 8 (Comparative) | Yes | JPC XPM7510 + Versify ™ 3200 | 40 | 60 | PP 4712 + no modifier | 100 | 0 |
| Vistamaxx ™ EM-1 Modified Sealing Layer | | | | | | | |
| 9 (Comparative) | Yes | JPC XPM7510 + Vistamaxx ™ EM-1 | 70 | 30 | PP 4712 + no modifier | 100 | 0 |
| 10 (Inventive) | Yes | JPC XPM7510 + Vistamaxx ™ EM-1 | 40 | 60 | PP 4712 + no modifier | 100 | 0 |

TABLE 2-continued

Modification of Sealing Or Core Layers Of Films 1 to 23

| FILM NO. | Lamination | Sealing Layer | Terpolymer (wt. %) | Modifier (wt. %) | Core Layer | Core (wt. %) | Modifier (wt. %) |
|---|---|---|---|---|---|---|---|
| 11 (Inventive) | Yes | JPC XPM7510 + Vistamaxx ™ EM-1 | 20 | 80 | PP 4712 + no modifier | 100 | 0 |
| Versify ™ 3000 Modified Sealing Layers ||||||||
| 12 (Comparative) | Yes | JPC XPM7510 + Versify ™ 3000 | 70 | 30 | PP 4712 + no modifier | 100 | 0 |
| 13 (Comparative) | Yes | JPC XPM7510 + Versify ™ 3000 | 40 | 60 | PP 4712 + no modifier | 100 | 0 |
| 14 (Comparative) | Yes | JPC XPM7510 + Versify ™ 3000 | 20 | 80 | PP 4712 + no modifier | 100 | 0 |
| Vistamaxx ™ EM-2 Modified Sealing Layer ||||||||
| 15 (Inventive) | Yes | JPC XPM7510 + Vistamaxx ™ EM-2 | 20 | 80 | PP 4712 + no modifier | 100 | 0 |
| 16 (Inventive) | Yes | No terpolymer + Vistamaxx ™ EM-2 | 0 | 100 | PP 4712 + no modifier | 100 | 0 |
| Vistamaxx ™ 6102 Modified Core Layer ||||||||
| 17 (Comparative) | No | JPC XPM7510 + no modifier | 100 | 0 | PP 4712 + Vistamaxx ™ 6102 | 80 | 20 |
| 18 (Comparative) | No | JPC XPM7510 + no modifier | 100 | 0 | PP 4712 + Vistamaxx ™ 6102 | 60 | 40 |
| 19 (Comparative) | No | JPC XPM7510 + no modifier | 100 | 0 | PP 4712 + Vistamaxx ™ 3980 | 60 | 40 |
| Vistamaxx ™ 3980 Modified Sealing Layer ||||||||
| 20 (Comparative) | Yes | JPC XPM7510 + Vistamaxx ™ 3980 | 60 | 40 | PP 4712 + no modifier | 100 | 0 |
| 21 (Inventive) | Yes | JPC XPM7510 + Vistamaxx ™ 3980 | 20 | 80 | PP 4712 + no modifier | 100 | 0 |
| 22 (Inventive) | Yes | EP 8573 + Vistamaxx ™ 3980 | 0 | 100 | PP 4712 + no modifier | 100 | 0 |
| Vistamaxx ™ 3980 Modified Sealing Layer ||||||||
| 23 (Comparative) | Yes | PP 4712 + Vistamaxx ™ 3980 | 50 | 50 | PP 4712 + no modifier | 100 | 0 |

Example 1

Seal Initiation Temperature, Hot Tack Strength, and Hermeticity

Films 1-23 were tested to obtain the minimum seal initiation temperature (SIT), hot tack strength, and hermeticity and the results were reported in Table 3, below.

TABLE 3

SIT, Hot Tack Strength, Hermeticity, & Haze for Films 1 to 23

| FILM NO. | SIT (° C.) | Hot Tack Strength (g/inch) | Hermeticity (% with no leaks) | Haze |
|---|---|---|---|---|
| 1 (Reference) | 112 | 251 | 72 | 1.04 |
| Vistamaxx ™ 3980 Modified Sealing Layer |||||
| 2 (Comparative) | 112 | 392 | 85 | 0.73 |
| 3 (Comparative) | 101 | 339 | 87 | 0.58 |
| 4 (Inventive) | 97 | 303 | 90 | 0.56 |
| Reference Film: Adsyl; No Modifier |||||
| 5 (Reference) | 86 | 286 | 63 | 0.63 |
| Versify ™ 3200 Modified Sealing Layer |||||
| 6 (Comparative) | 113 | 322 | 81 | 0.76 |
| 7 (Comparative) | 103 | 379 | 83 | 0.7 |
| 8 (Comparative) | 99 | 318 | 83 | 0.6 |
| Vistamaxx ™ EM-1 Modified Sealing Layer |||||
| 9 (Comparative) | 113 | 398 | 72 | 0.75 |
| 10 (Inventive) | 97 | 371 | 79 | 0.48 |
| 11 (Inventive) | 90 | 340 | 89 | 0.41 |
| Versify ™ 3000 Modified Sealing Layers |||||
| 12 (Comparative) | 112 | 387 | 83 | 0.73 |
| 13 (Comparative) | 103 | 411 | 92 | 0.56 |
| 14 (Comparative) | 100 | 413 | 81 | 0.49 |
| Vistamaxx ™ EM-2 Modified Sealing Layer |||||
| 15 (Inventive) | 95 | 427 | 66 | 0.43 |
| 16 (Inventive) | 84 | 368 | 81 | 0.44 |
| Vistamaxx ™ 6102 Modified Core Layer |||||
| 17 (Comparative) | 110 | 234 | — | 3.2 |
| 18 (Comparative) | 110 | 180 | — | 4.2 |
| 19 (Comparative) | 110 | 185 | — | 0.97 |
| Vistamaxx ™ 3980 Modified Sealing Layer |||||
| 20 (Comparative) | 107 | 343 | 87 | 0.42 |
| 21 (Inventive) | 100 | 339 | 82 | 0.47 |
| 22 (Inventive) | 63 | 303 | — | 0.51 |
| 23 (Comparative) | 127 | — | 75 | 0.65 |

Seal Initiation Temperature

Films 2, 3, and 4 have the same amount of Vistamaxx™ 3980 modifier in the sealing layer as Films 6, 7, and 8 have Versify™ 3200 modifier, respectively. The inventor observed that Films 2, 3, and 4 respectively have lower SIT than Films 6, 7, and 8. Furthermore, Inventive Film 4 was observed to have lower SIT than Comparative Films 2 and 3 (having 20% Vistamaxx™ 3980 modifier).

The inventor further surprisingly found that Inventive Film 21 (80% Vistamaxx™ 3980 modifier+EP 8573) had lower SIT than Reference Film 1 (100% 105° C. terpolymer) and Comparative Film 20 (40% Vistamaxx™ 3980 modifier+EP 8573). Also, Inventive Film 22 (100% Vistamaxx™ 3980 modifier) surprisingly had a much lower SIT (more than 20° C.) than the low SIT Reference Film 5 (100% Adsyl 7462).

Hot Tack Strength

Reference Film 1 had an undesirably low hot tack strength of 250 g/inch. The inventor found that Inventive Films 4, 10, 11, 15, 16, and 21 had higher hot tack strengths than Reference Film 1. Furthermore, Inventive Films 10, 11, 15, 16, and 21 had hot tack strengths greater than that of Reference Film 5.

The inventor surprisingly found that Inventive Film 15 displayed a superior hot tack strength of greater than 410 g/inch, which was greater than any other film tested. Accordingly, it appears that the addition of Vistamaxx™ modifiers to the sealing layer, in amounts of greater than 50 wt. %, improves hot tack performance in most formulations including EP 8573 (random copolymer).

Hermeticity

Films modified with Vistamaxx™ have improved hermeticity when compared to Reference Film 5. Further, Inventive Films 4, 10, 11, 16, 21, and 22 have improved hermeticity when compared to Reference Film 1. In particular, Inventive Film 4 had a very high hermeticity of 90%.

Haze

Inventive films have comparable haze as or better haze than Reference Films 1 and 5.

Example 2

Crimp Seal Range

Films 1, 4, 11, and 16 were tested for crimp seal range, and the data is reported in Table 4, below.

TABLE 4

Crimp Seal Range

| Film | Crimp Seal Range (° C.) |
|---|---|
| 1 (Reference) | 60 |
| 3 (Comparative) | 70 |
| 4 (Inventive) | 80 |
| 11 (Inventive) | 100 |
| 16 (Inventive) | 110 |

Inventive film 4 (sealing layer modified with 60 wt. % Vistamaxx™ 3980) provide a 10-20° C. wider operating range than Reference Film 1 (unmodified sealing layer) or Comparative Film 3 (sealing layer modified with 40 wt. % Vistamaxx™ 3980). Films 11 and 16, having 80% Vistamaxx™ EM-1 and 100% Vistamaxx™ EM-2, respectively, further increase the operating range by 40° C. and 50° C., respectively, as compared to Reference Film 1. Indeed, as the amount of modifier in the sealing layer increases, the crimp seal range increases. Accordingly much faster line speeds may be achievable. This may allow significant improvements in production (such as doubling production output) without adding a new machine.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

I claim:

1. A film comprising:
    (i) at least one sealing layer consisting of a modifier, the modifier consisting of a copolymer of propylene derived units and one or more comonomers selected from the group consisting of $C_2$ and $C_4$ to $C_{10}$ alpha-olefin derived units, the copolymer having:
        (a) an intermolecular composition distribution of greater than or equal to 75%;
        (b) a $T_m$ in the range of from about 25° C. to about 110° C.;
        (c) a $H_f$ in the range of from about 0.5 to about 70 J/g;
        (d) an $M_w/M_n$ in the range of from about 1.2 to about 4.5; and
        (e) an MFR in the range of from about 0.1 to about 40 g/10 min; and
    (ii) at least one core layer, comprising a polymer having:
        (a) a propylene derived unit content of greater than 90 wt. %, based on the weight of the polymer;
        (b) a $T_m$ of greater than 120° C.; and
        (c) a MFR in the range of from about 0.1 to about 100 g/10 min;
    wherein the film has a seal initiation temperature of 100° C. or less; and
    wherein when a seal is formed, the sealed film has a hermeticity of 65% or more.

2. The film of claim 1, wherein the modifier further has at least one of the following properties:
    (i) a $T_c$ of about 200° C. or less;
    (ii) a density in the range of from about 0.85 to about 0.92 g/cm$^3$;
    (iii) a percent crystallinity in the range of from 0.25% to 40%;
    (iv) an mm triad tacticity index of 75% or greater;
    (v) a substantial absence of $^{13}$C NMR peaks corresponding to a regio-error at about 14.6 and about 15.7 ppm, the peaks being of about equal intensity;
    (vi) a m/r ratio of more than 1;
    (vii) a Vicat Softening Point of 105° C. or less; and
    (viii) a Mooney viscosity of less than 100.

3. The film of claim 1, wherein the modifier is a propylene/ethylene copolymer.

4. The film of claim 1, wherein the film is oriented, in at least one of the machine direction or transverse direction, to the same or different extents.

5. The film of claim 1, wherein the film has a hot tack strength of greater than 126 g/cm.

6. The film of claim 1, wherein the film has a crimp seal range of 80° C. or more.

7. An article comprising the film of claim 1.

8. The article of claim 7, wherein the modifier has at least one of the following properties:
  (i) a $T_c$ of about 200° C. or less;
  (ii) a density in the range of from about 0.85 to about 0.92 g/cm$^3$;
  (iii) a percent crystallinity in the range of from 0.25% to 40%;
  (iv) an mm triad tacticity index of 75% or greater;
  (v) a substantial absence of $^{13}$C NMR peaks corresponding to a regio-error at about 14.6 and about 15.7 ppm, the peaks being of about equal intensity;
  (vi) a m/r ratio of more than 1;
  (vii) a Vicat Softening Point of 105° C. or less; and
  (viii) a Mooney viscosity of less than 100.

9. The article of claim 7, wherein the article is a bag or a pouch.

10. The article of claim 7, wherein the article is sealed.

11. The article of claim 7, wherein the article is a metallized bag.

12. The film of claim 1, wherein the film is a heat sealable cast film.

13. The film of claim 1, wherein the film is a heat sealable biaxially oriented film.

* * * * *